(12) United States Patent
Trinon et al.

(10) Patent No.: US 6,983,321 B2
(45) Date of Patent: Jan. 3, 2006

(54) SYSTEM AND METHOD OF ENTERPRISE SYSTEMS AND BUSINESS IMPACT MANAGEMENT

(75) Inventors: Jean-Marc Trinon, Liege (BE); Philippe Moitroux, Bassenge (BE); Bernard Lemercier, Braine-l'Alleud (BE); Olivier Pignault, Elancourt (FR)

(73) Assignee: BMC Software, Inc., Houston, TX (US)

( * ) Notice: Subject to any disclaimer, the term of this patent is extended or adjusted under 35 U.S.C. 154(b) by 733 days.

(21) Appl. No.: 09/900,283

(22) Filed: Jul. 6, 2001

(65) Prior Publication Data

US 2002/0138571 A1 Sep. 26, 2002

Related U.S. Application Data

(60) Provisional application No. 60/217,178, filed on Jul. 10, 2000.

(51) Int. Cl.
G06F 15/173 (2006.01)
G06F 17/60 (2006.01)

(52) U.S. Cl. .......................................... 709/224; 705/7
(58) Field of Classification Search ................ 709/223, 709/224; 705/1, 7; 703/22
See application file for complete search history.

(56) References Cited

U.S. PATENT DOCUMENTS

| | | | |
|---|---|---|---|
| 4,750,137 A | 6/1988 | Harper et al. | 364/514 |
| 4,837,679 A | 6/1989 | Wiles, Jr. et al. | 364/200 |
| 4,937,739 A | 6/1990 | Ernst et al. | 364/200 |
| 5,122,949 A | 6/1992 | Harper et al. | 395/109 |
| 5,222,235 A | 6/1993 | Hintz et al. | 395/600 |
| 5,396,623 A | 3/1995 | McCall et al. | 395/600 |
| 5,430,871 A | 7/1995 | Jamoussi et al. | 395/600 |
| 5,432,901 A | 7/1995 | Harper et al. | 395/156 |
| 5,432,933 A | 7/1995 | Janicek | 395/650 |
| 5,440,692 A | 8/1995 | Janicek | 395/700 |
| 5,446,885 A | 8/1995 | Moore et al. | 395/600 |
| 5,463,555 A | 10/1995 | Ward et al. | 364/468 |
| 5,566,334 A | 10/1996 | Loader | 395/650 |
| 5,572,674 A | 11/1996 | Ernst | 395/200.1 |

(Continued)

OTHER PUBLICATIONS

Gramignoli et al., "A profile for the IT manager within SMEs", Proceedings of the 1999 ACM SIGCPR conference on Computer personnel research, ACM Press, pp. 200–208.*

(Continued)

Primary Examiner—Ario Etienne
Assistant Examiner—David Lazaro
(74) Attorney, Agent, or Firm—Wong, Cabello, Lutsch, Rutherford & Brucculeri, LLP

(57) ABSTRACT

A system architecture and a method for management using a cellular architecture to allow multi-tier management of events such as the managing of the actual impact or the potential impact of IT infrastructure situations on business services. A preferred embodiment includes a high availability management backbone to frame monitoring operations using a cross-domain model where IT Component events are abstracted into IT Aggregate events. By combining IT Aggregate events with transaction events, an operational representation of the business services is possible. Another feature is the ability to connect this information to dependent business user groups such as internal end-users or external customers for direct impact measurement. A web of peer-to-peer rule-based cellular event processors preferably using Dynamic Data Association constitutes management backbone crossed by event flows, the execution of rules, and distributed set of dynamic inter-related object data rooted in the top data instances featuring the business services.

15 Claims, 27 Drawing Sheets

U.S. PATENT DOCUMENTS

| | | | | |
|---|---|---|---|---|
| 5,577,197 | A | | 11/1996 | Beck ..................... 395/183.04 |
| 5,579,515 | A | | 11/1996 | Hintz et al. ................. 395/607 |
| 5,615,359 | A | | 3/1997 | Yung .......................... 395/610 |
| 5,625,817 | A | | 4/1997 | Wood et al. ................ 395/614 |
| 5,655,081 | A | | 8/1997 | Bonnell et al. ........ 395/200.32 |
| 5,664,217 | A | | 9/1997 | Cunningham et al. ...... 395/821 |
| 5,761,667 | A | | 6/1998 | Koeppen .................... 707/101 |
| 5,761,676 | A | | 6/1998 | Wood et al. ................ 707/202 |
| 5,764,953 | A | | 6/1998 | Collins et al. .............. 395/500 |
| 5,815,096 | A | | 9/1998 | Smith ........................... 341/51 |
| 5,860,069 | A | | 1/1999 | Wright .......................... 707/4 |
| 5,892,907 | A | | 4/1999 | Harper et al. ............ 395/200.3 |
| 5,913,037 | A | | 6/1999 | Spofford et al. ....... 395/200.56 |
| 5,958,012 | A | * | 9/1999 | Battat et al. ................ 709/224 |
| 5,978,594 | A | | 11/1999 | Bonnell et al. ............. 395/837 |
| 6,011,871 | A | | 1/2000 | Xu .............................. 382/240 |
| 6,014,740 | A | | 1/2000 | Shearer, Jr. ................. 712/233 |
| 6,016,501 | A | | 1/2000 | Martin et al. ............... 707/203 |
| 6,029,178 | A | | 2/2000 | Martin et al. ............... 707/201 |
| 6,035,307 | A | | 3/2000 | Martin et al. ............... 707/203 |
| 6,108,700 | A | * | 8/2000 | Maccabee et al. .......... 709/224 |
| 6,134,676 | A | | 10/2000 | VanHuben et al. ........... 714/39 |
| 6,141,647 | A | | 10/2000 | Meijer et al. .................. 705/1 |
| 6,401,119 | B1 | * | 6/2002 | Fuss et al. .................. 709/224 |
| 6,442,557 | B1 | * | 8/2002 | Buteau et al. .................. 705/7 |
| 6,519,714 | B1 | * | 2/2003 | Sweet et al. ................ 709/203 |
| 6,526,387 | B1 | * | 2/2003 | Ruffin et al. .................... 705/7 |
| 6,670,973 | B1 | * | 12/2003 | Hill et al. ....................... 705/7 |
| 6,694,362 | B1 | * | 2/2004 | Secor et al. ................ 709/223 |
| 6,751,663 | B1 | * | 6/2004 | Farrell et al. ............... 709/224 |
| 6,859,781 | B1 | * | 2/2005 | Gloor et al. .................... 705/7 |

OTHER PUBLICATIONS

S. H. Schwartz et al; *Value–Oriented Network Management*; Apr. 10–14, 2000; Operations and Management Symposium "The Networked Planet: Management Beyond 2000," (Cat No. 00CB37074), Proceedings of Network Operations and Management Symposium, Honolulu, HI, USA.

*Mastercell™ Ultimate Event Management*; IT Masters White Paper; Jul. 1998, pp. 1–22; XP002219158.

Kubo K., et al; *A Method of Extracting Management Information for Service Management*; Mar. 1, 1998; vol. 10, No. 2, pp. 63–68; XP000740456.

Lewis, L.; Spectrum Service Level Management Definition, Offerings, and Strategy; Technical Note LML–CTRON–98–02; Mar. 30, 1998; XP002150696.

* cited by examiner

*Impact Propagation Policy 2 for 'Vital component' dependency type*

| Event Origin : instrumentation of the Master resource | | Event Origin : upstream dependency of the Master resource | |
|---|---|---|---|
| Severity of a new bsi event generated for the Master resource | Severity of the resulting bsd event generated for each of the Dependent resources | Severity of a new bsd event generated for the Master resource | Severity of the resulting bsd event generated for each of the Dependent resources |
| UNKNOWN | n.a. | UNKNOWN | n.a. |
| HARMLESS | n.a. | HARMLESS | n.a. |
| WARNING | n.a. | WARNING | n.a. |
| MINOR | n.a. | MINOR | MINOR |
| CRITICAL | MINOR | CRITICAL | MINOR |
| FATAL | FATAL | FATAL | FATAL |

*Impact Propagation Policy 6 for 'Secondary service' dependency type*

| Event Origin : instrumentation of the Master resource | | Event Origin : upstream dependency of the Master resource | |
|---|---|---|---|
| Severity of a new bsi event generated for the Master resource | Severity of the resulting bsd event generated for each of the Dependent resources | Severity of a new bsd event generated for the Master resource | Severity of the resulting bsd event generated for each of the Dependent resources |
| UNKNOWN | n.a. | UNKNOWN | n.a. |
| HARMLESS | n.a. | HARMLESS | n.a. |
| WARNING | n.a. | WARNING | n.a. |
| MINOR | n.a. | MINOR | n.a. |
| CRITICAL | n.a. | CRITICAL | WARNING |
| FATAL | WARNING | FATAL | WARNING |

CONFIGURABLE

*FIG. 25*

SHOWING AVAILABILITY DISCIPLINE CONTEXT

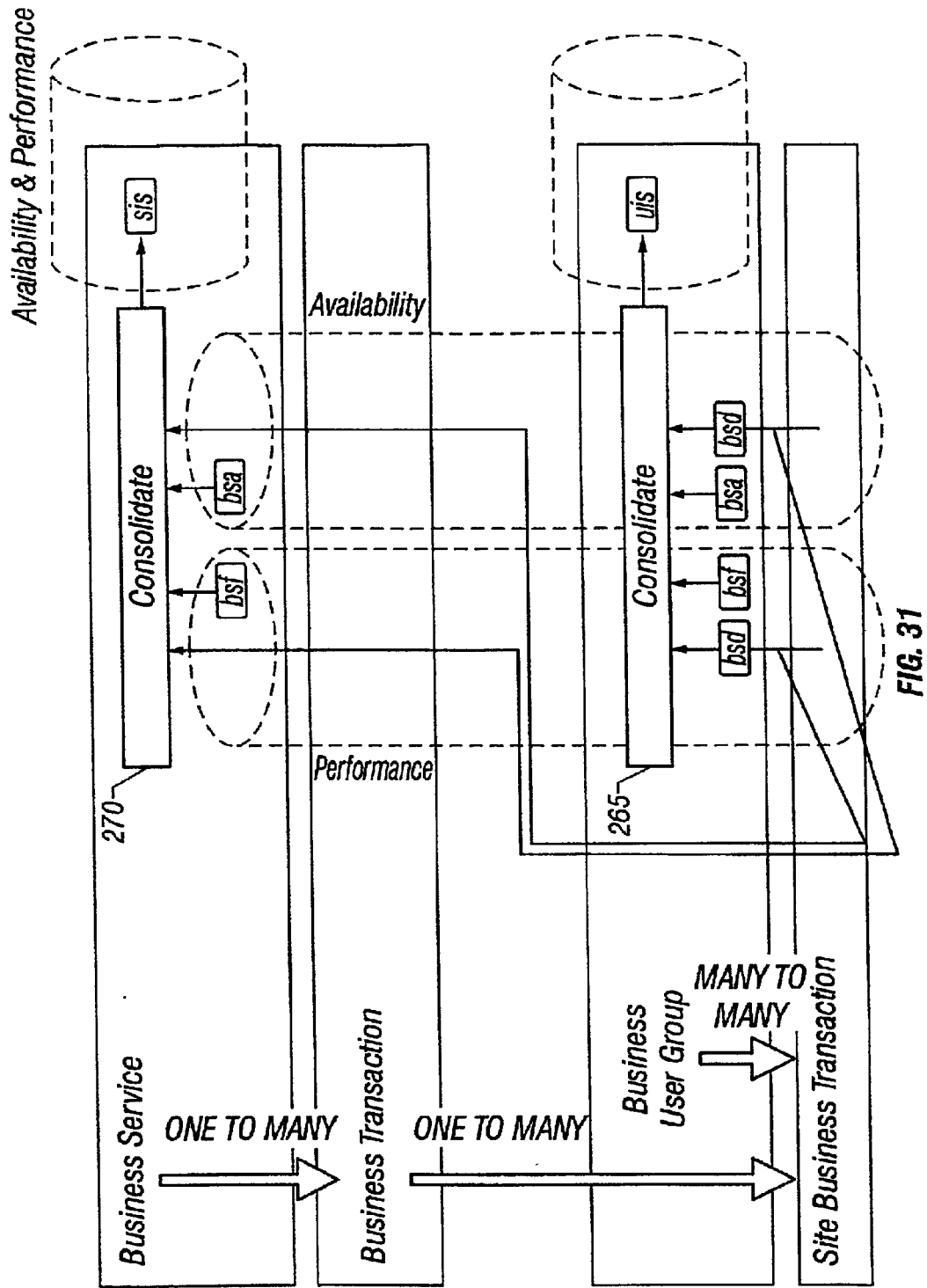

SYSTEM AND METHOD OF ENTERPRISE SYSTEMS AND BUSINESS IMPACT MANAGEMENT

SPECIFICATION

This application relies upon U.S. Provisional Patent Application Ser. No. 60/217,178 filed Jul. 10, 2000.

FIELD OF THE INVENTION

The present invention generally relates to the Availability Management and Performance Management disciplines of the Enterprise Systems Management (ESM) field where programs measure the availability and the responsiveness of computer applications. This invention also relates to Service Level Management (SLM) as a recommended preliminary stage or building block as it provides an integrated view of the business services submitting transactions to those applications, thus authorizing effective business impact management.

BACKGROUND OF THE INVENTION

In today's fast moving environment, business activities tend more and more to rely on the system, and e-business infrastructures progressively merge with internal information technology (IT) infrastructures. Ultimately, IT becomes essential to the business. To that end, companies try to monitor and manage their IT not only from a technical perspective, but also from a business perspective. Ensuring that all the IT components are available and performing well is still required, although such parameters, including any outage or slowness that might occur must be interpreted ultimately in terms of business impact. Then, when dependencies are understood by both parties and effectively controlled by the management system, SLM can be implemented.

IT Managers are challenged by the necessity of managing a growing number of IT resources including networks, systems, databases, and applications that are distributed over global organizations. The ability to commit on Service Levels and immediately detect and adequately react to alert conditions is critical in today's heterogeneous corporations. An enterprise management solution must cope with the distributed nature of IT resources and provide fault-tolerant capabilities in a dynamic environment.

Event management remains a fundamental area in IT Enterprise Management because it is impossible to predict the many failures that occur. More and more mission-critical applications require complex, heterogeneous, and distributed resources. These inter-related resources must be monitored in order to provide IT operations with an accurate picture of the enterprise. Because the IT infrastructure is critical to businesses, it is important that problems are discovered, analyzed, and fixed as soon as possible. The goal is to minimize the impact on the core business.

The various probes or monitors that are watching the distributed resources in order to detect malfunctions or changes can produce huge amounts of data in the form of events. Existing event management solutions mostly rely on either a centralized or two-tiered architecture. Historically, the centralized solutions appeared first but their limitations were quickly identified which led to the development of the two-tiered solutions.

Having limited analysis and automation capabilities at the agent level can result in losing information and building an inaccurate representation of what is happening. Indeed if the agent does not have the ability to apply a complex configurable automation and analysis, it will have to send the information to the server that has these capabilities and let the server react. The time involved in sending to the server and having the server react is sometimes enough so that the situation is completely changed when the server is able to query for some more information. Therefore, the representation of the situation that the server is building can often be completely off the mark.

Going with this fundamental trend, several products claim to offer a business-oriented operation management capability and/or a SLM capability. As such, they relate to new market segments like the Business to IT alignment market, the Enterprise Operations Enhancement market, or more extensively the SLM market. But there exists a need in today's environment to manage not hundreds of 'static' devices but thousands and thousands of objects—some being "real" as they pertain to the IT world; others being "logical and dynamic" as they move closer to business concepts; and they are all distributed.

A number of established vendors have provided insufficient solutions that were invented in the early nineties for client/server architectures. Each tries to manage an environment with an architecture that is dissimilar to what is being managed. This architecture has failed to be successful in the long run. The product suites described in this architecture included a plurality of components. The following description focuses on the scope of the description to those of the components that are directly contributing to the event processing architecture.

One example of these product suites is sold by BMC Software Corp. (see http://www.bmc.com) under the trademark PATROL 2000. This product includes a default 2-tier architecture including the Patrol Enterprise Manager™ (PEM) and the Patrol Agents. The PEM requires a Unix only specific hardware infrastructure. Moreover, it is slow and easily overloaded. This model can be extended to a three-tier architecture by adding an intermediate component: the Patrol Operations Manager™ (POM). The POM needs a Windows® NT only specific hardware infrastructure. POMs cannot talk horizontally or vertically to their peers. Communication is not possible between two POMs. Moreover, there is neither POM-to-POM embedded synchronization capability nor any fault tolerance capability. The only way to "synchronize" a POM is to have a Patrol Agent forward an event to another POM. This action has to be programmed as a customized function and is not offered as a feature. Also, POMs do not implement any event correlation but a "filter and forward to PEM" model. From a functional standpoint, the approach lacks a logical layer to combine cross-domain, cross-discipline data for meaningful business impact determination. From a technical standpoint, this product has a strict hierarchical architecture capable of only bottom-up event flows. To date, PATROL 2000™ comes with three different consoles: the PEM console, the POM console and the Patrol Agent console. A mix of dedicated Unix and Windows® NT servers is required.

Another product suite, sold by Tivoli Corp. (see http://www.tivoli.com) under the trademark Tivoli Enterprise™, also includes a default 2-tier architecture including the Tivoli Enterprise Console™ (TEC) and, in the low end, the Distributed Monitoring™ (DM) engines complemented with TEC Adapters. The TEC also requires a dedicated hardware infrastructure. It is also slow and easily overloaded. This model can be extended to a three-tier architecture by adding an intermediate component: the Availability Intermediate Manager™ (AIM). The AIM also requires a dedicated hardware infrastructure. Notably, AIM was built out of Tivoli IT Director, a newer, different technology than TEC. Some notable problems are that rules must be written to keep events synchronized and no security or encryption is available in the communication protocol between the AIMs and TEC. In addition, DM events can only be sent to AIMs through an external process that increases the load on the managed systems. In addition, Tivoli also provides a Standalone Prolog Rule Engine™ (SPRE) which is positioned as a fast intermediate event processor with no front-end graphical user interface (GUI) and no persistent event repository. If a SPRE crashes prior to having performing a saved state, all events received since the last saved state will be lost and unavailable on restart. From a technical standpoint, this product has a hierarchical architecture primarily aimed at supporting bottom-up event flows. To date, Tivoli Enterprise™ comes with 2 different consoles: the TEC JAVA™ GUI and the AIM JAVA™ GUI. A number of dedicated Unix or Windows® NT servers is required.

Another product suite, sold by Micromuse Corp. (see http://www.micromuse.com) under the trademark Netcool/OMNIbus, also includes a 2-tier architecture—when not used as a Manager of Managers (MOM). This architecture includes: the Netcool ObjectServer™ and the Netcool/Impact™ application server on the high end; and the Netcool Probes&Monitors™ on the low end. The Netcool ObjectServer™ is a high-speed, in-memory central event database. Several Netcool ObjectServers™ can be chained in a peer-to-peer 'hierarchy' using Netcool Gateways™ to provide bi-directional interfaces between them, with synchronization and take-over capabilities. However, those components remain "central servers" in the sense that they are not designed to build a distributed multi-layered network of processors.

Thus, there is a need for an improved method and architecture for measuring and reporting availability and performance of Business Services in today's environment, where numerous objects with moving dependencies have to be managed in large distributed infrastructures. There is also a need for an intermediate functional layer providing configurable abstraction services. There is a further need for the processing component to be able to (a) collate, correlate, or generate instrumentation and dependency events; (b) communicate and synchronize with its peers; (c) implement some form of resilience; and (d) accept dynamic data updates as a means to support environment changes. There is yet another need for the processing component to be able to play various roles throughout the management architecture, without compromising its default capabilities. There is still another need for a unique console component to be able to interact with any of the processing components, whatever role each plays in the management architecture.

SUMMARY OF THE INVENTION

By using a distributed approach to intelligent analysis, software programs with analysis capabilities are deployed in a plurality of locations. Those capabilities allow the setup of advanced analysis and automation down close to the resources that are being monitored, therefore alleviating the typical problems of the two-tier or agent/server solutions. Using a peer to peer approach allows for ultimate scalability of the analysis and automation capabilities. Moreover it is possible to provide a faster and more accurate analysis of problems occurring in distributed systems. The dynamic nature of the distributed environments provides a solution that is able to adapt automatically to new conditions without reconfiguration of these event processors. For this purpose, the use of Dynamic Data Association™ (DDA) makes it possible to build generic rules or a rules model that can be distributed to a plurality of different event processors and then use data associations to adapt the generic rules to the particular environment where they operate. By using the DDA methodology for event management, it is possible to avoid a lot of the costs associated with maintaining with the systems of the prior art.

In accordance with the aforementioned needs, the present invention is directed to an improved method and architecture for measuring and reporting availability and performance of Business Services. The present invention has features which enable the storage and the maintenance of business object definitions in an autonomous peer-to-peer engine, (hereinafter referred to as a service processor) with: each object of type Business Service (root object) controlling a subset of objects of type business transaction; each object of type business transaction branching on one or several objects of type site business transaction (SBT); each SBT object controlling an orderly sequence of objects of type site application transaction (SAT); and/or each SAT object branching onto one IT Path. A typical reason for maintaining site-specific objects is that users located in different branch offices can submit the same business transaction to a central location. As the transaction originates from the user's office, it creates a different "path" for each of those users in the context of said business transaction. Additionally, objects of type business user group can be declared and associated to any number of site business transactions related to the same or to different parent Business Services.

The present invention may include other features which enable a service processor to record a list of related IT Aggregates for each object of type IT Path. The entries of such a list together represent a snapshot of the supporting IT elements for the IT Path. These entries are uniquely identified by an IT Aggregate identification (ID). When a list is created or updated, a subscription request is sent to the Object Directory Services (ODS) processor serving the service processor. Such requests are automatically processed by the ODS processor as described further on in this narrative. As a result, abstracted IT Aggregate events are received by the service processor for each IT Path object whose dependency list contains an IT Aggregate ID matching the one contained in these events. The service processor further abstracts those events so that they contribute in the impact determination process for site application transactions, site business transactions, Business Services, and business user groups.

The present invention has yet other features which enable a service processor to submit at configurable intervals a sample application transaction to a selected source location, where the location pertains to one specific IT Path. As part of this action, specific monitoring requests are sent along the IT Path to control the execution of the application transaction, when applicable. The execution of this compound monitoring action relies on the execution service and the instrumentation service of the Access Layer processors. As the sample site application transaction unfolds, events are generated and sent back to the service processor having initiated the action. The service processor dynamically abstracts the site application transaction events so that this information contributes in the impact determination process for site business transactions, Business Services, and business user groups.

Moreover, the present invention has yet other features which enable a service processor to combine the information coming from IT monitoring and the one coming from Transaction monitoring in business impact statements applying to Business Services and business user groups. Furthermore, the present invention has still other features which enable a service processor to automatically switch a complete Business Service to a "maintenance mode" based on an external calendar file specifying the planned outage periods for the Business Service. At the end of the specified period, the service processor switches the Business Service back to "operational mode." Consequently, during that period, transaction monitoring operations are disabled by the service processor for all the business transactions grouped under the Business Service incoming IT Aggregate events are discarded and business transaction objects are set to "maintenance mode."

The present invention has other features which enable the storage and the maintenance of IT object definitions in an autonomous peer-to-peer engine (hereinafter referred to as a domain processor controlling a logical IT Domain) with each object of type IT Aggregate being characterized by at least one aggregation pattern specifying a list of IT Components. A typical reason for maintaining two or more aggregation patterns for a given IT Aggregate is that the technical service or capability described by the IT Aggregate can be provided by an active backup configuration in addition to the set of IT Components normally delivering it. Notably, two aggregation patterns can share some IT Components.

When an IT Aggregate is created or updated on a domain processor, a subscription request is sent to the ODS processor serving the IT Domain for each IT Component listed in (one of) the aggregation pattern(s) of the IT Aggregate. Such requests are automatically processed by the ODS processor as described below. As a result, abstracted IT Component events are received by the domain processor for each IT Aggregate aggregation pattern wherein an IT Component ID matches the one contained in said events. When the primary pattern is considered available, availability, and performance information for that pattern are abstracted and propagated upward to all the service processors having registered interest in the parent IT Aggregate. On the other hand, when the primary pattern is considered unavailable, the next available pattern, if any is used. When all patterns are "down," the primary pattern is used.

The present invention may also include other features that enable the storage and the maintenance of processor information in an autonomous peer-to-peer engine, the ODS processor, including: for each active domain processor, its name, the name of the parent IT domain, and a list of the IT Aggregate objects it owns; and for each service processor, its name and a list of the IT Component objects it owns.

The present invention may also include other features which enable an ODS processor to process a subscription request coming from a service processor where the request indicates an interest in receiving any availability or performance events to occur for the IT Aggregate whose ID is specified in the request. The ODS processor retrieves the parent IT Domain and the active domain processor owning the IT Aggregate and then registers the service processor specific interest on the active domain processor which in turn replicates on its backup, if any.

The present invention may also include other features which enable an ODS processor to process a subscription request coming from a domain processor wherein the request indicates an interest in receiving any availability or performance events to occur for the IT Component whose ID is specified in the request. The ODS processor retrieves the service processor owning the IT Component and then registers the domain processor specific interest on the service processor, along with the name of the backup domain processor, if any.

The present invention may also include features which enable the storage and the maintenance of IT object definitions in an autonomous peer-to-peer engine, the service processor, with each object of type IT Component identifying an atomic resource (e.g., a computer program process, a hard-disk) or a compound resource (e.g., an application service) residing in the production machine where the service processor runs or in close by machines or proprietary devices; and each object of type IT Indicator representing an availability parameter or a performance parameter for a given IT Component. Notably, an IT Component can have one or several IT Indicators associated to it. Moreover, an IT Indicator can be configured to work with one of two event source types: independent event sources require event capture arguments as they each deliver a range of events generated by an ESM monitoring tool, a private script, or an adapter; indicators relying on such event sources are primarily targeted at integrating existing monitoring environments or environments where the present invention is not expected to have a direct control on how and how frequently parameters are monitored. On the other hand, controlled event sources point on embedded instrumentation function(s) driven by the service processor and generating their own events.

The present invention may also include other features which enable the storage and the maintenance of Dependency object definitions in a processor with each object of such type characterizing the relationship between (a) a resource stored in the same processor and known as the "master resource;" and (b) another resource stored in the same processor or in remote one and known as the "dependent resource." Each Dependency is further defined by a dependency type that relates to a specific impact propagation policy. A number of dependency types are predefined and come with a customizable impact propagation policy. Most of those dependency types rely on a standard processing scheme that can be used to support additional types. Impact propagation is managed on a per-discipline basis (i.e. availability or performance). A resource can be involved in multiple Dependency relationships, being at the same time a "master resource" in some relationships and a "dependent resource" in other relationships. In addition, a resource can have more than one relationship with another resource. When an event is delivered, each Dependency where the related resource acts as a "master resource" is evaluated against said event using the impact propagation policy applicable for said Dependency. If the impact is ascertained for a given "dependent resource," the impact event is abstracted into a dependency event. If "dependent resource" is maintained on a remote processor, the newly generated dependency event is automatically forwarded to it.

The present invention may include another feature which enables a processor to audit any event it has received or that has been generated locally by searching backward and forward through all the events that are related to the event as abstraction events, abstracted events, consequence events, or cause events. This recurrent analysis leads to a representation of chained events, usually in the form of tree patterns as opposed to linear patterns containing, on some ends, the ultimate situations the event is involved in or contributes to and, on other ends, the initial situations it results from. Such analysis can run seamlessly across the boundaries of the processors, like from a service processor, through one or several domain processors and to various service processors. Though natural, this "vertical" illustration (from the Business Layer through the Abstraction Layer to the Access Layer) should not be regarded as a unique technical path. Indeed, the "drill" capability provides a mean for retrieving a logical hierarchy of abstractions, causes, or consequences (all determined by standard processing schemes or by customized Dependency relationships) and can operate, for example, throughout the "horizontal" network of service processors.

The present invention may also include a feature which enables a "what if" mode or simulation mode to be used in parallel of the "real-time" mode. By default, the "what if" mode involves only the Business Layer. At any time, it is possible to request a snapshot in a service processor of the availability and performance states of all the objects of type IT Path, SAT, SBT, Business Service, and business user group with the purpose of creating a Simulation Entry Point. As an alternative, it is possible to request a reset of the Simulation Entry Point to default values. Notably, the Simulation Entry Point can be used later in the time, while the operational states of the objects have changed. From this point, any combination of state changes can be submitted in the form of fake IT Aggregate events (bss) to determine what the impact would be on upper business objects.

The primary system component, referred to as a processor, is a robust, fast and lightweight engine implementing a resilient peer-to-peer collaborative model whose general concepts are described under the trademark Cellular Event Processing Architecture™ (CEPA) engine. Processors can be installed with instrumentation functions. Processors can be configured to 'play' various roles, using a combination of event structures, data structures, control structures, actions, and rules referred to as a Knowledge Base (KB). Whatever the role, they still benefit from their default capabilities including: the embedded synchronization mechanisms, the peer-to-peer communication protocol and the online data interface.

In addition, there is a system component referred to as an e-Console that may register for events. With the appropriate access rights, the e-Console can connect to any of the aforementioned processors, including several at a time. Display relies on a hierarchical tree of event collectors, each collectors containing a list of events and each entry in the list giving access to (a) an information summary, (b) the details of the slots, (c) a drill function, or (d) a context-sensitive action list. Event collectors are obtained from the processors in accordance with the access rights of the user profile. Those collectors can be static or dynamic. Dynamic collectors are created on the fly, based on incoming events, and using some configurable patterns. Collectors can be combined into logical groups, namely meta-collectors. Eventually, event filters can be used to customize the display.

BRIEF DESCRIPTION OF THE DRAWINGS

The foregoing and other features, functions and benefits will be better understood from the following detailed description of the invention with reference to the drawings wherein:

FIG. 25 depicts an Impact Propagation Policies chart at the representative company according to the present invention;

FIG. 31 depicts an event processing steps chart from the site business transaction level up to the Business Service level according to the present invention.

DETAILED DESCRIPTION OF PREFERRED EMBODIMENT

Figure 1:
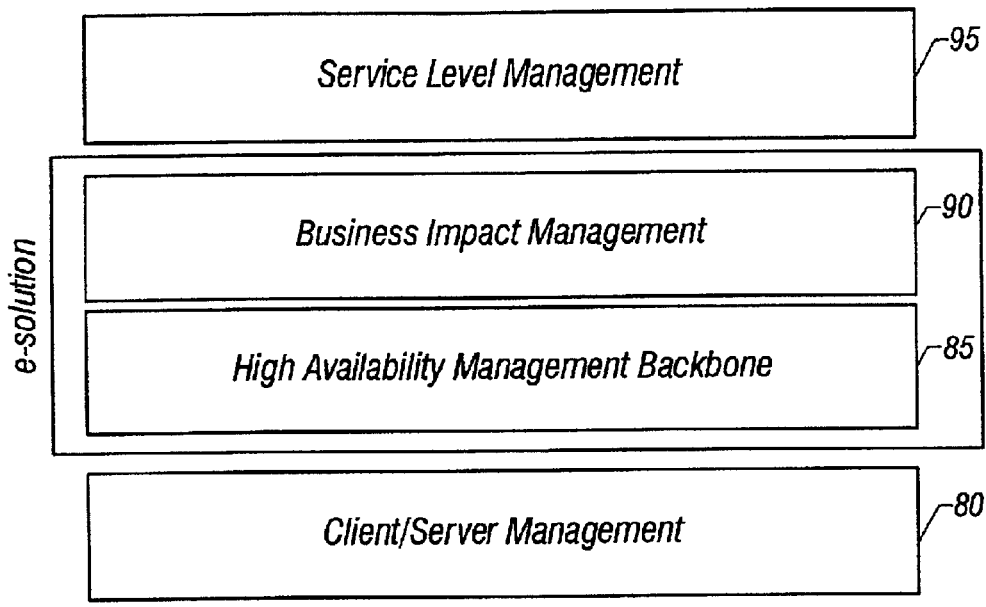
FIG. 1 depicts a chart showing how business impact management positions between client/server management and service level management.

As shown in FIG. 1, a Business Impact Management 90 and High Availability Management Backbone 85 are positioned between Client/Server Management 80, as the actual outcome of ESM legacy monitoring tools, and Service Level Management 95, as the ultimate target of today's companies. The implementation of a High Availability Management Backbone 85 may be regarded as a preliminary step for the deployment of a Business Impact Management solution.

Figure 2:
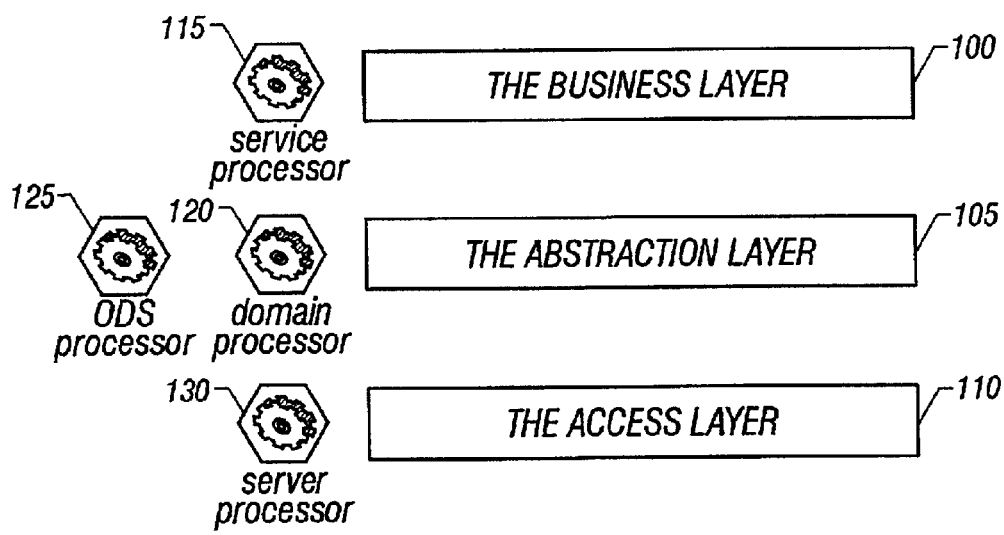
FIG. 2 depicts a representative three-layer functional architecture chart according to the present invention.

As depicted herein, FIG. 2 shows a three-layer functional architecture which supports the concept of High Availability Management Backbone 85 with: a high-end Business Layer 100 implementing one or several peer-to-peer processors configured to run as service processors 115; an intermediate Abstraction Layer 105 implementing one or several peer-to-peer processors configured to run as domain processors 120 or as Object Directory Services (ODS) processors 125; and a low-end Access Layer 110 implementing an active network of peer-to-peer processors configured to run as service processors 130. Bi-directional communications take place between all the layers, as further explained on FIGS. 3, 8, and 9. Notably, while the service processors, the domain processors, and the service processors all belong to the operational plan where the main stream of event processing resides, the ODS processors are disposed in an orthogonal plan aimed at providing support or control functions throughout the architecture.

Figure 3:
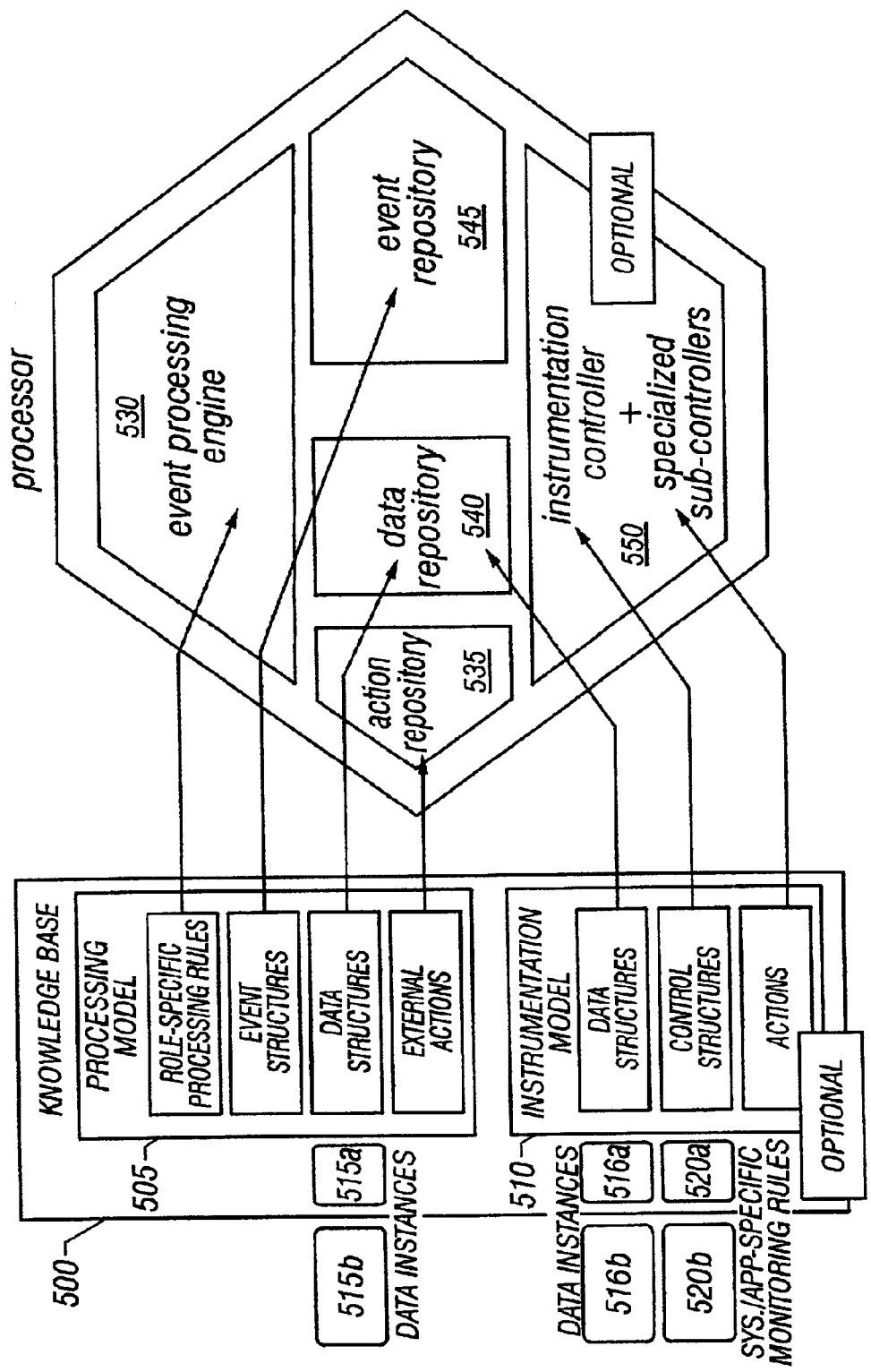
FIG. 3 depicts a chart of the preferred structure of a processor and the preferred contents of a knowledge base.

As shown in FIG. 3, a preferred structure of a processor and the contents of a knowledge base is shown. A processor is made of an event processing engine 530 using three complementary repositories: the action repository 535 that gives access to external scripts or programs; the data repository 540 wherein data instances are maintained, and the event repository 545 wherein events are saved. An instrumentation controller along with specialized sub-controllers 550 can be activated in the processor when there is a need for monitoring actions. As such, a processor does not implement any specific processing or instrumentation model. In order to play a role, a processor must be loaded with a knowledge base. A knowledge base 500 provides a processing model 505 and optionally an instrumentation model 510. The first model is a combination of rules, event structures, data structures, and external actions, possibly complemented with some data instances 515a like the default values for the management policies. The second model is a combination of data structures, control structures, and actions, usually complemented with a set of specific monitoring rules 520a aimed at controlling the basic monitoring actions, with default parameters 516a. When operating, the processor can be further updated with new or modified data instances 515b, 516b, monitoring rules 520b, and monitoring actions.

In a preferred embodiment, the deployment of event processors capture the semantics of events close to the source of the event and performs a majority of operations locally. Only events that have global impact or affect other sources are propagated to other cells, thus preventing event storms and reducing network usage. In-depth analysis of the events can be performed through immediate queries in the environment in which the events occurred. A multi-tiered arrangement facilitates the selective propagation of the events to the applications and/or administrators interested in them. The overall robustness is significantly enhanced because there is no single point of failure such as a central event server. Each event processor is preferably a lightweight, yet powerful event analysis engine that can be distributed across the IT infrastructure. Cells can be combined in a network across which events are propagated. This network of cells results in the multi-tiered architecture with the cells located between agents, monitors, and/or probes on one side and the central server(s) on the other side.

Any cell can prepare a visual representation of the impact of the events on the different business components which enables distribution of service level management. Administrators can visually access the events processed by the cells using the event browser. Each event processor collects, processes, responds to, and stores the events according to management rules loaded from a knowledge base. This system may include an event browser such as a JAVA™-based Graphical User Interface (GUI) application that connects to one or more cells and allows the operators to browse through the stored events. The system may preferably include a knowledge base (KB) editor that may also be a JAVA™-based GUI application that enables off-line editing of knowledge bases. The edited knowledge bases can then be distributed to the cells used throughout the IT infrastructure. Finally, the system may include at least one adapter that is a background process capable of detecting events and format the data into an event description in the language understood by the cells.

Figure 4:
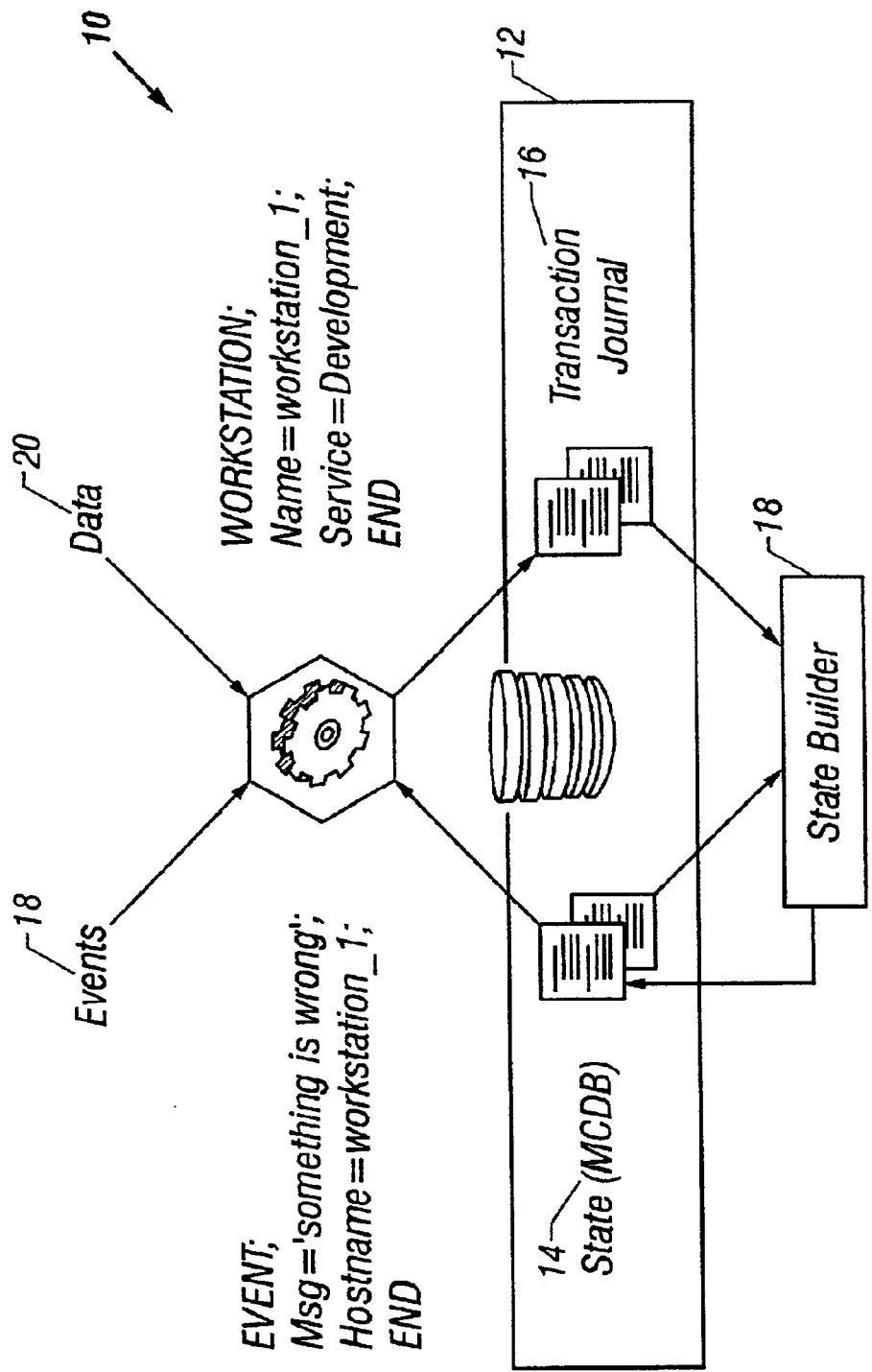
FIG. 4 depicts a chart of the preferred structure of a processor.

The distributed environment system copes with a very large number of devices and the events that each generates. Rather than collecting all of the events into a centralized repository, each event processor installed across the distributed environment stores events locally. Preferably, this storage is persistent so that operations of the event processor can be suspended without losing information. The storage system handles transactions such that the event processor 10 can maintain a reliable consistence. In a preferred embodiment, the storage subsystem 12 is implemented using two files: a state file 14 and a journal file 16 as shown in FIG. 4. The state file 14 contains a description of the events 18 and data objects 20 as they were known by the event processor 10 at some point in time. By example only, the event 18 in this example is

```
EVENT;
    Msg='something is wrong';
    Hostname=workstation_1;
END
and the data object 20 is
WORKSTATION;
    Name=workstation_1;
    Service=Development;
END
```

The journal file 16 is storing the transactions performed by the event processor 10. For each transaction, the event processor 10 records the changes (addition, suppression, modification) it performs on the events 18 and data objects 20. At regular interval and when the system is not overloaded, the event processor 10 can trigger the update of the state file 14. In a preferred embodiment, the update is performed by an independent process that reads the old state file 14, then reads the journal 16, and applies the changes in order to produce a new state file 14. At that stage the old state file 14 might be deleted. When triggering the production of a new state file 14 by state builder 22, the event processor 10 can continue its operation but it will open a new journal file 16. The advantage of this system is that the event processor 10 focuses on writing the changes sequentially in the journal file 16. This preferred method is a simple, lightweight, and fast operation compared to updating tables in a relational database system. Advantageously, the event processor 10 can better handle a massive number of events 18 arriving over a short period of time. This massive number of events 18 is sometimes referred to as an event storm.

With each of the event processors distributed across the environment storing events, there is no single place where all the events are located. Therefore, the event console GUI connects to a plurality of event processors in order to provide a better overall picture. The event processors are able to forward events and data between themselves also. With events being forwarded to many different places, there is a need to keep track of where each event came from and where each event is propagated. Without this information, it would be very difficult to update all the copies of events when a change is performed, thus leading to inconsistencies between the event processors. In a preferred embodiment, the tracking information is stored directly in the events. In this fashion, each event object contains a set of fields that store the information necessary to know where the event is coming from and where it has been propagated. In the event that the propagation cannot connect immediately to the destination, the event processor may buffer the propagation information and periodically try to reestablish the connection. When the connection is reestablished, the event processor will propagate the information.

The propagation information can also be used by the GUI to connect to the event processors that have a copy of the event based on a review of the event description. The GUI can display the path of propagation and, when connected the event processors on that path, the GUI can explore how the event relates to others in that particular processor. In this manner, the system is able to start from one single event description in one event processor and explore the other processors that worked on the event in order to provide a complete picture to the operators. Within one event processor, relationships can be created between events. An example of relationship is the cause/effect relationship that can link an event considered as a probable cause to its multiple effects. Another example is the abstraction relationship that is used to build one event out of several others.

The abstraction relationship can provide a higher level of information into one single event description. Through the abstraction relationship, an abstract event is produced and linked to the abstracted events. The abstraction event can be viewed as one event that is summarizing the problem reported by the multiple abstracted events. Another use of the abstraction event is to provide a generic description of problems so a complete model of analysis can be built without focussing on the exact format of the events that the monitoring sources are going to use. This is helpful for working in distributed environments where multiple different monitoring sources can be used.

Rules are typically used to setup abstractions. An abstraction rule is triggered by the arrival of many different classes of events and generates a single event description. The rule instructs the system on how to produce the abstraction from the information coming in the received events. This method allows for different event descriptions of the same problems to be reformatted into a generic abstraction.

The following provides an example of the versatility of the invention. For instance, two different monitoring programs are able to report events about the disks attached to server hardware. The two monitoring programs are likely to use different formats for their event representations.

Monitoring Software A may report the problem with the following format:

```
A_DISK_EVENT;
    Drive = 'C:' ;
    Server = 'Server_1';
END
```

Monitoring Software B may report the problem with the following format:

```
B_ALERT_ON_DISK;
    System = 'Server_1' ;
    Sub_System = 'C:';
END
```

It is impractical to build a model for the analysis of the event that relies on those specific event formats because they use different fields. That is where it is useful to setup an abstraction. In a preferred embodiment, the abstraction may use the following format:

```
DISK_PROBLEM;
    System = 'Server_1' ;
    Disk = 'C:' ;
END
```

Accordingly, using this abstract rule process, the format is not limiting.

```
Abstract DISK_PROBLEM ($DP)
From A_DISK_EVENT ($A)
    Setup {
        $DP.System = $A.Server ;
        $DP.Disk = $A.Disk ;
    }
from B_ALERT_ON_DISK ($B)
    Setup {
        $DP.System = $A.System ;
        $DP.Disk = $A.Sub_System ;
    }
```

Preferably, to avoid generating duplicate abstraction, the definition of the abstraction format should contain declarations such that the system can detect the generation of a duplicate. In the current example, a duplicate generation needs to be avoided when the two monitoring programs do report the problem for the same 'Disk' on the same 'System'. The declaration of the DISK_PROBLEM event class could look like this:

```
CLASS: DISK_PROBLEM
DEFINES {
    System: STRING, duplicate_key=yes ;
    Disk: STRING, duplicate_key=yes;
    ....
}
```

Assuming 'System' and 'Disk' are the only two fields being declared as part of the duplicate key, this means that two DISK_PROBLEM events are considered duplicates when they have the same values for their fields 'System' and 'Disk'.

Assuming all those declarations and rules are available, the event processor can then generate a single description like

```
DISK_PROBLEM;
    System = 'Server_1' ;
    Disk = 'C:' ;
END
```

If events reporting the same problem on the same disk are reported by the two monitoring programs, both original events generated by those programs will remain in the event processor and be linked through an abstraction relationship with one single DISK_PROBLEM event. The big advantage being that the rest of the analysis can be based on the DISK_PROBLEM event. With the abstraction relationship explicitly recorded between events, it is possible to explore which events produced the abstraction from the GUI. The exploration of those relationships is done through the same interface that enables exploration of the propagation paths followed by events.

With event processors distributed across multiple different architecture, it is most preferable that the Knowledge Bases prepared by administrators can be distributed independently from the target architecture. For example, the same knowledge base could be distributed indifferently to workstations running for example Sun Solaris™ or Microsoft Windows® NT. One method to accomplish this goal is to include a rule interpreter. Because former rule interpreters performed poorly, it is preferably to use a virtual machine in the event processor capable of interpreting intermediate byte-code. An example of virtual machine is a Warren Abstract Machine (WAM). Using a compiler that produces Warren Intermediate Code (WIC) from the rules defined in the knowledge base, the WIC code may be maintained independent from the target architecture. Because administrators may want to preserve the integrity of the code of their knowledge and discourage reverse engineering, the rules compiler is preferably capable of encoding the intermediate code into a non-readable format.

Time synchronization of distributions is important for time dependent analysis. For time dependent analysis, each event received by an event processor is first time-stamped with the time at which it was stored in the event itself. When an event is propagated from one event processor to another, it is preferable to preserve the original timestamp. Because of the nature of the invention, it is possible that the origin processor and the target processor run on two different computers. Those computers may not have their clocks synchronized. For the origin processor, "present time" may be 2:00 P.M. For the target processor, "present time" may be 2:05 P.M. In order to prevent the event from detecting the inconsistency, the event processors may have to apply a correction to the timestamps based on an estimation of the difference between time clocks on the system or systems. By establishing some threshold criteria on the estimated difference between clocks, the event processors should estimate the differences between the clocks and account for the discrepancy.

A preferred embodiment of the invention includes an auto-limitation feature during heavy analysis. When an event processor is installed on some business critical server, the administrator may want to auto-limit the event processor, i.e. restrict its processing power to a percentage of its capabilities. This shall avoid situations where the event processor would tax too much of the resources on the server because of an event storm. In this embodiment, the event processor has to benchmark its own operations regularly and adapt its auto-limitation accordingly. During normal operations, the event processor will attempt to evaluate its processing capabilities while the other event processors continue to function on the computer. This benchmark will provide the upper limit of the work the event processor allows itself to perform. This upper limit may be determined by simulating a full processing including such activities as parsing, analysis, and storage of a predefined set of events. Running this benchmark at regular interval allows adapting the auto-limitation to the actual load supported by the computer at different times. The administrator of the system can tune that auto-limitation by setting a parameter that instructs the processor to auto-limit itself at a given percentage of what the full processing power has been estimated through the benchmark. The event processor is thus proceeding to an adaptive throttling of its capabilities in order to preserve resources for the critical applications it has to share the computing resources.

By combining cells into a network, events can not only be processed as close as possible to the event source, but smarter processing of the events can occur. Each cell has access to a different view of the enterprise and events can not only be analyzed in the context of each other, but in the context of the current cell. This context is provided by the knowledge base and through the execution of external commands. Cells propagate specific events to other cells as appropriate depending on the results of the analysis. Several criteria can be applied to configure a network of cells and propagation of events within this network. One cell can be installed at every site where the company has facilities in order to work on the events collected from equipment located in these facilities. A second level of cells can be installed to receive events from all the cells within a particular location (e.g., country or state). A top-level cell can collect from any cell at the second level in order to provide a worldwide view.

Some cells can be dedicated to collecting Events related to database servers, while some others are dedicated to mission-critical applications. Multiple levels of cells can be used in order to provide application-specific and enterprise-wide views of the functional areas. Cells can be set up following organizational unit boundaries (e.g., departments). This type of configuration makes it possible to create a hierarchy of cells that mimics the hierarchy of organizational units. The network of cells can combine any of the criteria mentioned here as well as any other criteria. Typically the result will be some kind of multi-level network with a directed flow of events, but not necessarily a strict hierarchy. In order to provide scalability, the cells at lower levels are tuned to filter, aggregate, or establish relationships between events and propagate only important events to some other cells.

Figure 5:
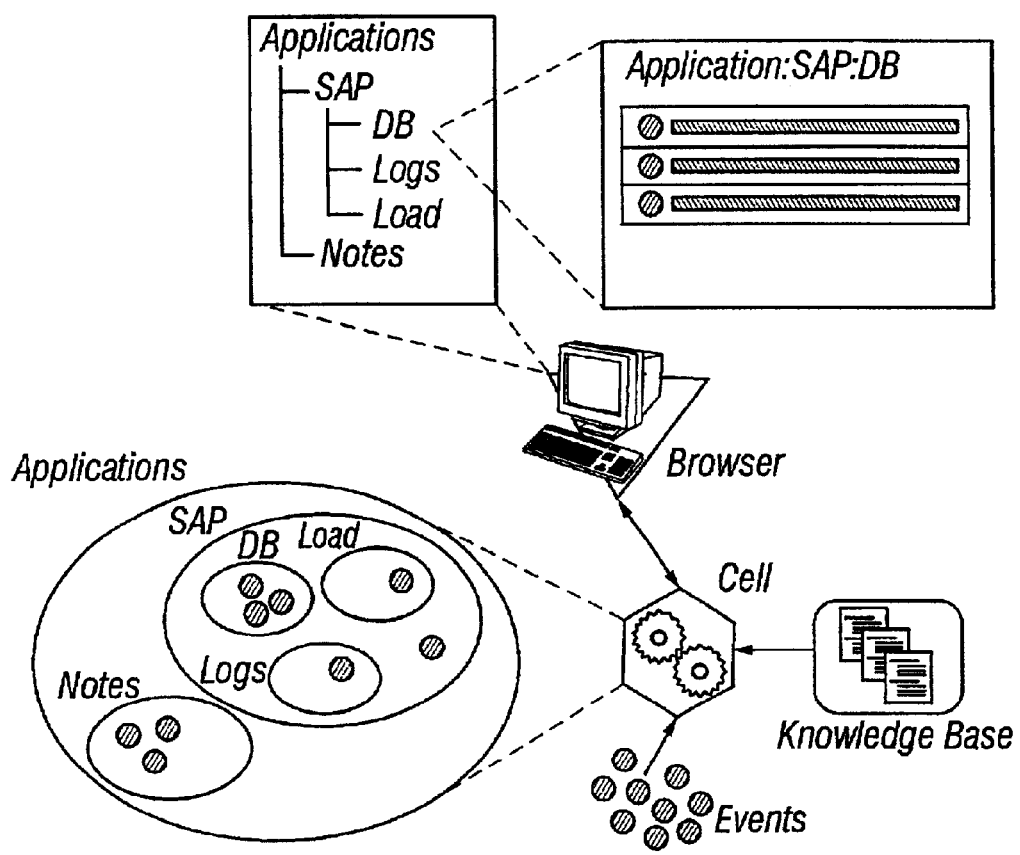
FIG. 5 depicts a chart of the preferred structure of an event collector.

Each cell is configured to group events into collectors. A representative event collector is shown in FIG. 5. Collectors are simply sets of events that meet pre-specified criteria. Collectors provide the ability to specify how the events are displayed to the event browsers. The collectors defined for one cell are published to any event browser that connects to the cell. Collectors are typically organized into hierarchies so specialized collectors may be combined into more generic collectors. Criteria used for defining the collectors range from location in the network application generating organizational unit to service levels. Collectors are presented in the event browser as an expandable tree with color-coded severity indicators. For each collector, the operator can view a list of all the events belonging to it. Collectors are defined in the knowledge base loaded by each cell.

Only significant events or events containing high-level descriptions of problems should be reported to the top-level cells in the network shown in more detail below. However, many events have been evaluated in order to decide what information to propagate upwards in the network of cells. These events are stored locally by the cells and can be of interest for operators who want to go into more details about some of the reported problems. To that effect, the event browser provides a "drill-down" capability where it is possible to explore the path that was followed by the events as well as relationships established between the events by the rules applied in the cells. Each cell is named and the cell directory provides the ability to reference cells by name independent of location. Cells and event browsers rely on the directory to establish the connection with cells. Through careful definition of cell directories, independent domains of cells or sub-domains can be established to allow different operators to access different levels of cells. Notably, communication with a cell can be protected with encryption. When protected, communications can only be established if the key is known. Each cell can trigger local actions in response to event situations or patterns. The actions can be taken as the result of the analysis performed by rules loaded from the knowledge base or/and by an operator through the event browser. The actions that can be triggered interactively are declared in the knowledge base.

The programs that are executed in response to events have access to the complete event description. The execution of the programs occurs on the workstation where the cell is installed. The cells are not active probes or agents. They do not poll to detect events. Event detection can be done using existing tools on the market. These tools may have different conventions for encoding the events. Natively in the preferred embodiment, the software understands events coded using the BAROC language. Other formats can be transformed into BAROC descriptions by the use of adapters. The BAROC language is used to define data structures describing objects or entities. The language has roots in the object-oriented data structuring techniques. Classes or types of entities (e.g. events) are defined and then instances of the defined object types are created. A class defines the fields that can be used in the description of instances of each type of event. In BAROC terminology, these fields are called slots.

BAROC is a highly structured language and provides the ability to capture the semantics of the events in a format suitable for processing. Some event management solutions use free text or message representation of events that can be expensive to process. It is better to structure the information conveyed by an event once when it enters the system rather than propagate a free-text representation of an event everywhere and rely on text-scanning functions to extract information each time it is needed. The BAROC language supports structured text classes and instance definitions with a very simple syntax as illustrated in the two previous figures. The cell reads these definitions, interprets the structure and builds an optimized representation of the event. Events not represented in the BAROC language cannot be sent to a cell. Such events have to first go through an adapter that translates the events into BAROC before sending the translated representation to a cell.

This portion of the invention comes with adapters that can translate Simple Network Management Protocol (SNMP) events, events from the NT Event Log and generic text log file entries (i.e. syslog). A self-contained command is also available to post events from scripts or directly from a terminal session. To use the data model built in BAROC, software has query and test facilities that work explicitly on the concept of classes and slots. These facilities unleash the power of the event data model. The event processor makes heavy use of these in the analysis of events.

The event processor or cell runs as a background process and may collect events, analyze events, respond to events, store events, propagate events, and/or group events. The cell builds the event collectors that are used by the browsers to present the events to users. These collectors are dynamic and an event may move among collectors as slot values for the event change. Configuration of the cell is done through a limited number of configuration files and through a knowledge base. The knowledge base encompasses the class definitions of the events that the cell can process, the rules to build the collectors, the rules to perform the analysis of the events and, optionally, executables for the external actions that may be triggered in response to events.

The configuration of the cell to support those different functions is done through a limited number of configuration files and the knowledge base. The knowledge base itself may contain class definitions of the events that the cell can process, rules to build the collectors, rules to perform the analysis and correlation of the events, rules to propagate events to other cells, and executables for the external actions that may be triggered in response to events.

As mentioned above, each cell works independently from its neighbor cells. If communication between cells is not possible at some point in time, all cells continue to do their work and simply buffer what they need to propagate to others. They catch up when communications are reestablished. Event processing is configured through rules included in the knowledge base. The rules are defined using the classes of events declared in the knowledge base.

Figure 6:
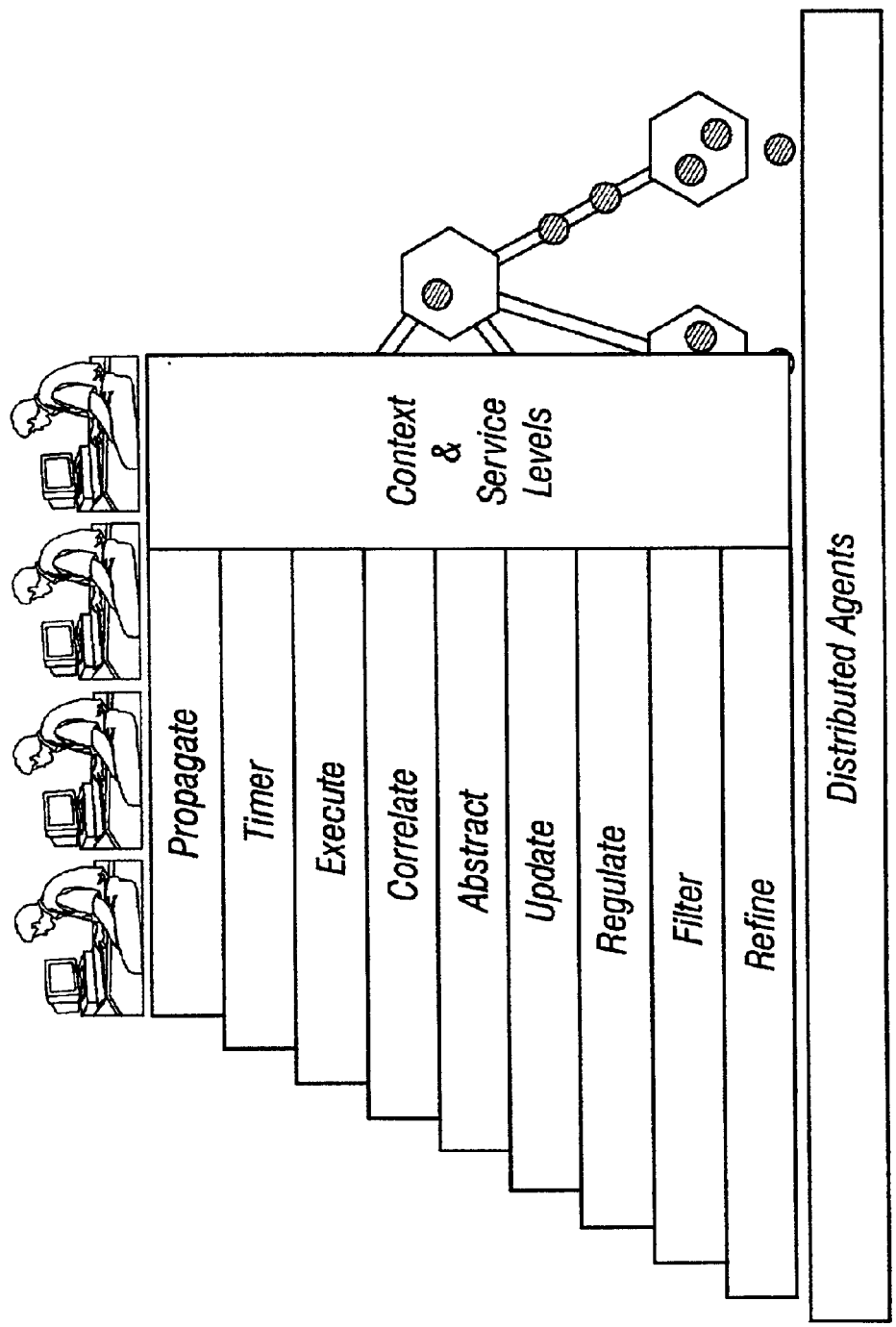
FIG. 6 depicts a chart of the phases of the analysis of events in the preferred embodiment.

The analysis of the events is organized into nine different phases as shown in FIG. 6. Each phase usually has a well-identified mission that allows the rule language to be greatly simplified and enables a strict organization of rules. This organization makes it possible to provide a fully functional GUI-based editor for the knowledge base. Users have a choice of using the knowledge base editor or editing the rules files directly. The set up of the event analysis into phases with an appropriate rule language provides a goal-oriented process for writing rules instead of a programming exercise. Administrators can focus on what they want to happen rather than how to write a rule. Basically, the rules are statements which combine tests and queries on the BAROC data model with actions to be performed depending on the type of rule.

These phases include refine. This phase is dedicated to "polishing" the events and collecting information that may be missing in the event description. It results in updating slot values of the events so as to standardize. The next phase is filter. This phase determines which events are going to be further in processed. It enables discarding of unwanted and/or irrelevant events. Following the filter phase, the regulate phase occurs. This phase handles duplicate events. It enables the cell to wait for a given number of repeated events within a specified time window before forwarding an event to the next phase. A conditional reset mechanism implements a hysteresis behavior. The next phase is update. In this phase, the system looks for previously received events that need to be updated with the information conveyed in a newly received event. Following update, the abstract phase takes place. During this phase, the cell tries to summarize events into a higher-level event description, as discussed above. It can help in dramatically reducing the number of events that need to be propagated. Furthermore, the analysis includes a correlate phase. This phase is used to compute the cause-effect relationships between events. The transitivity between the cause-effect relationships leads to the identification of the root cause of problems. Following correlate, the execution phase occurs. During this phase, the cell executes actions when an event satisfies certain conditions. Triggering of the execution can be based on dynamic conditions such as a slot value change. The timer phase may occur next. This phase introduces actions to be executed after a timer has expired. It provides a delayed execution mechanism. Finally, the propagate phase occurs. This phase defines which events get propagated and where they are propagated. Events may be propagated immediately after reception as well as later depending on slots in the event description receiving specific values.

Figure 7:
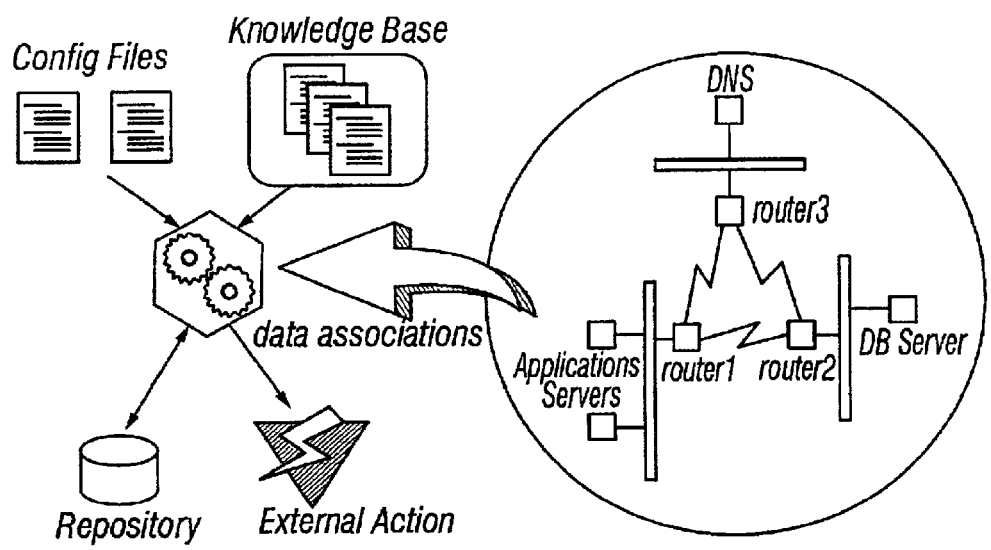
FIG. 7 depicts a chart of a preferred method using the Dynamic Data Association™ method.

In a preferred embodiment, the present invention uses DDA technology to break out implementation-specific, topological data from the rules and put that data in tables, so they can be updated on the fly at runtime. Then instead of writing rules against specific data items, the user may write them against the data contained in the DDA tables. FIG. 7 shows the use of data associations to learn an environment.

Using DDA technology, it is possible to prepare a knowledge base that performs intelligent analysis of an IT infrastructure without coding anything specific about the infrastructure directly in the rules. Instead, the rules are dynamically associated with data representing that specific knowledge. It is sufficient to provide the event processor with the data associations in order to initiate the analysis process to a specific infrastructure. If something changes in the environment, providing the updates makes the event processor adapt itself to the new situation dynamically, without recoding the rules. The data representation allows the recording of IT infrastructure element properties, as well as the relationships between the different elements. A complete set of elements and their relationships can be coded in order to get a full description of a complex environment.

The event processor uses the BAROC language for data encoding, the same language used for event encoding. Using BAROC for data representation enables reuse of the same query/test facilities on the data and/or on the events. When creating a knowledge base, BAROC classes are defined. These classes enumerate tags that can be used to describe the instances. The data code can include just about anything: topology information, application setup information, components, dependencies, and similar information.

Preparation of data classes in the knowledge base is a requirement for the cell to interpret instances provided at runtime. Having the data structures defined, it is then possible to write rules that refer to the data structures without knowing any specifics about the instances. When the rules are evaluated, the event processor is able to search for specific data received as instances. Data can be sent to the event processor or updated while it is at work. Changing the available instances of a given data class modifies the evaluation of rules that refer to that specific class. Therefore, it is possible to build generic rules that automatically adapt themselves to changes in the IT environment. To make the data useful, it needs to be associated with rules. The idea is that when a rule is evaluated, it queries the data to decide in which context the rule is applicable. When creating rules, the data instances are not known. Therefore, the association statements must be expressed as queries on the set of data. The rules are then further evaluated using the solution(s) from these queries.

When the event processor receives an event reporting that a service is not available, it must search for applications running on the affected workstation and then find which of those applications depends on the failing service. Thus, it is possible to associate combinations of data elements with rule, taking into account the complex dependencies found in distributed IT environments. A knowledge pack is simply a canned knowledge base that can be used immediately by an event processor in order to perform intelligent analysis on events received. Knowledge packs can be prepared for varied typical environments and/or applications. The knowledge packs include event class definitions, actions that can be triggered in response to events, data class definitions, and rules.

Experts prepare these knowledge packs. They define the data classes that are used in the rules and expect data instances to be created for a specific environment. The data instances can be provided explicitly by the administrators (through a GUI application or from the Command Line Interpreter ("CLI")) or can be automatically generated by an auto-discovery agent. Providing the cell with data instances is relatively simple. It is at least several orders of magnitude simpler than coding a complete knowledge base. If the pre-built knowledge pack requires modification for special situations, it is possible to use the graphical Knowledge Base Editor to introduce the required changes.

The user can adjust the behavior of the present invention on the fly, at runtime. If an application is moved, the user may simply update the tables with their new locations. If new servers are added to a web farm, the user may insert them into the tables and the rules will use the new information automatically. If one needs to bring a whole new line of business under management, just add the information to the tables. This gives unprecedented benefits to the enterprise. For example, maintenance costs drop immensely. Instead of having a team of dedicated rule writers on call who change the rules for every change on the monitored systems, the user writes the rules once and this system creates automated systems, such as a web site, for updating the DDA tables when the environment changes.

An example of DDA is a rule that which takes each record in the Close_Event_Table and adds it to the message slot:

```
execute walk_table : EVENT ($EV)
where [status: equals OPEN]
using ALL
{
   Close_Event_Table ($CT)
}
when $EV.status: equals OPEN
{
   $EV.msg = $EV.msg || ' ' || $CT.class_up || ',' || $CT.class_down ||';';
}
END
```

Any OPEN event that is received by the cell will have the following appended to its message slot:

"HOST_UP, HOST_DOWN; PROCESSOR_UP, PROCESSOR_DOWN; NFS_SERVER_UP, NFS_SERVER_DOWN; CLEAR_MAINTENANCE_EVENT, SET_MAINTENANCE_EVENT; HOST_OK, SWAP_FULL;ntDiskPercentUsage, by universal_swapavail;"

reflecting the fact that this rule will walk every record in a DDA table.

The user may also update the table on the fly at runtime, extending the scope of a DDA enabled rule quickly and easily. If the user has another pair of classes due to client changes, the user may add them using the client, and the next incoming event will use the new data.

Figure 8:
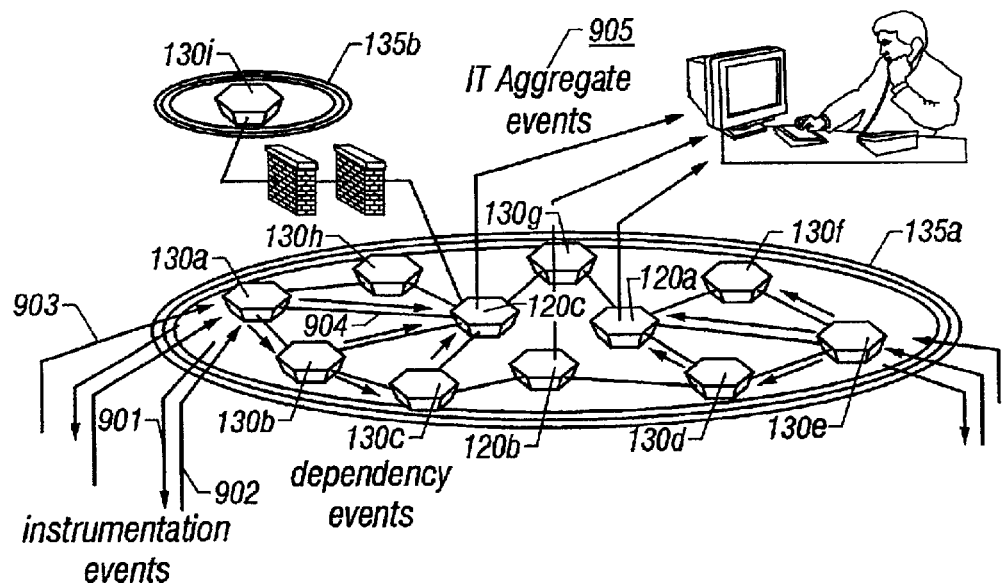
FIG. 8 depicts a partial view of a high availability management backbone according to the present invention.

A representative high availability management backbone is depicted in FIG. 8. From a general perspective, such a backbone can be regarded as a cellular network or a group of interconnected cellular networks 135*a*, 135*b* spreading over several locations and possibly several companies. In the latter case, each company can actually operate its own backbone and allow only a limited set of interactions both from a technical and a functional stand point with the other backbones. A backbone is typically made, in the low end, of multiple service processors 130*a*–130*i* either collecting events from external monitoring sources 903 or using embedded instrumentation functions to actively monitor some IT Components and generate their own events 901, 902. Those complementary actions are all maintained as IT Indicators and relate to IT Components. Based on the dependencies existing between the IT Components, an incoming instrumentation event can lead to the generation of additional dependency events interpreted in the local processor or propagated to the remote service processor(s) owning the dependent IT Components. Similarly, dependency events can lead to the generation of new dependency events. As a result, horizontal event flows are created throughout the access layer, as illustrated by the arrows between the service processors such as 130*a*→130*b*→130*c*; 130*e*→130*d*; 130*e*→130*f*. IT Component events, i.e. instrumentation and dependency events are all abstracted by the service processors into IT Aggregate events that are then propagated 904 to the domain processors 120*a*–120*c* of the Abstraction Layer. Abstraction and propagation are made according to the specific "interest" of each domain processor. Using a system component referred to as an e-Console, an operator can connect to the domain processors in order to view or manipulate those events 905, including drilling down to the underlying events in the Access Layer.

Figure 9:
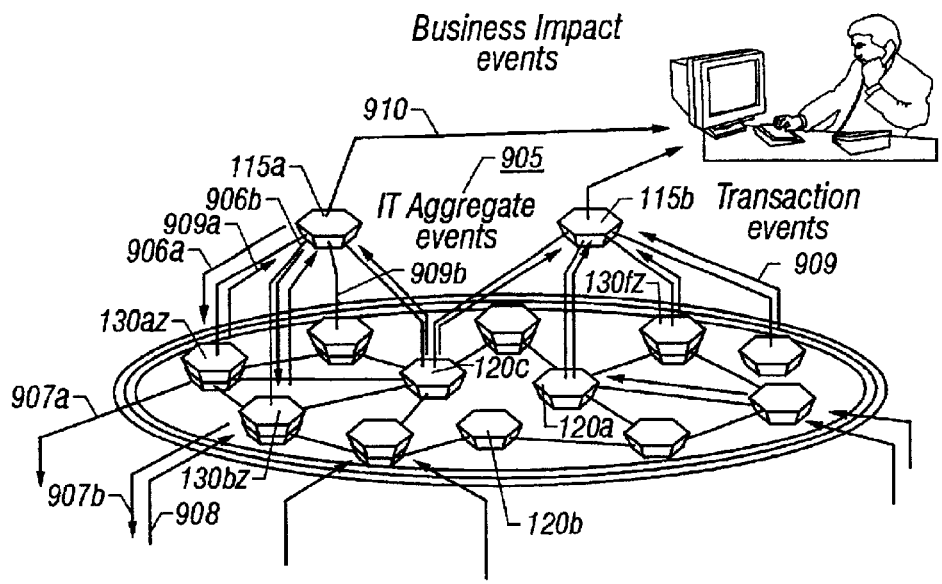
FIG. 9 depicts a complete view of a high availability management backbone according to the present invention.

As shown in FIG. 9, IT Aggregate events are all abstracted by the domain processors 120*a*–120*c* into IT Path events that are then propagated 905 to the service processors 115*a*, 115*b* of the Business Layer. Abstraction and propagation are made according to the specific "interest" of each service processor. In parallel, each service processor can generate Site Transaction Emulation And Detection (STEAD) activation or de-activation requests. An activation request encompasses one sample site application transaction emulation sub-request (including frequency) completed with several detection sub-requests (including function name and input data) dispatched along a specific transaction IT Path. A de-activation request disables all the sub-requests of an activation request for a given site application transaction (SAT). Such requests are submitted directly to the service processors, although they can be relayed by an elected domain processor when required, for example, when restricted access apply on a remote location.

Information about which processor(s) should be contacted for a STEAD request is provided on demand by ODS processors which maintain the appropriate mapping table. When receiving a STEAD emulation sub-request 906*a*, a service processor permanently enables the sample site application transaction and triggers its execution 907*a*, in accordance with the specified frequency, using an incremental SAT-specific identification tag. For each cycle, it sends back an execution confirmation event 909*a* containing a timestamp and the last SAT tag used. When receiving a STEAD detection sub-request 906*b*, a service processor permanently activates 907*b* the specified instrumentation function with the input data in order to capture any execution information related to a sample site application transaction. For each match 908, it sends back an execution control event 909*b* containing a timestamp and the SAT tag detected.

All the STEAD events are consolidated in the originating service processor, along with the propagated IT Path events, on a per-SAT basis. This leads eventually to the generation of Business Impact events related to Business Services and business user groups. Using an e-Console, an operator can connect to the service processors in order to view or manipulate those events 910, including drilling down to the underlying events. Notably, additional processing capabilities may be required in the service processors in order to support the STEAD sub-requests. These extensions can be added in the service processors 130*az*, 130*bz* that run IT monitoring operations or they can be implemented in dedicated service processors.

Figure 10:
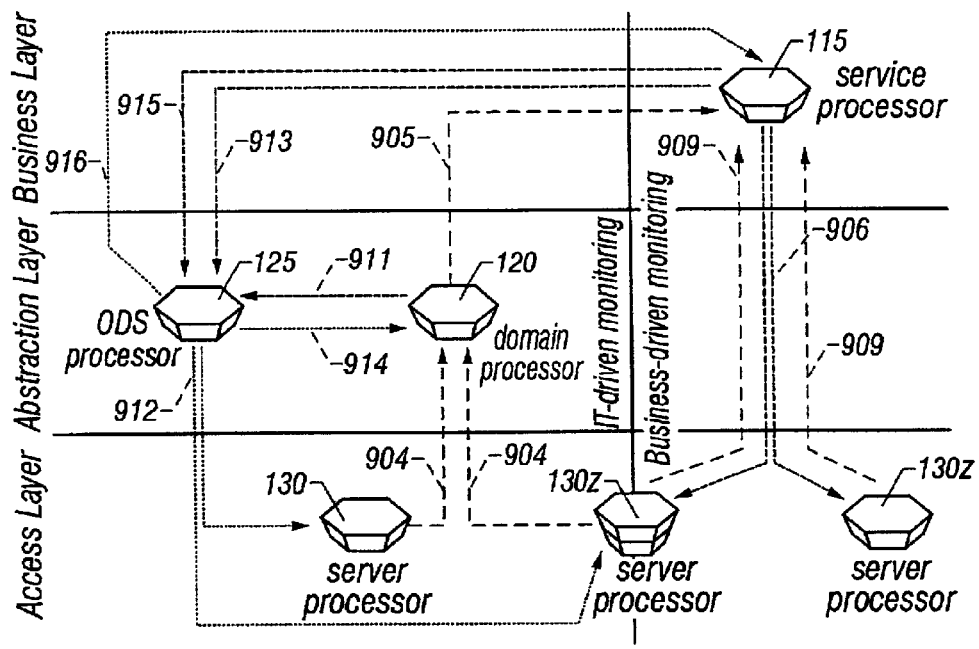
FIG. 10 depicts cross-layer communications chart according to the present invention.

Referring to FIG. 10, a cross-layer communications is shown in the aforementioned three-layer functional architecture. At initialization or when an IT Aggregate object is added or updated, a domain processor 120 sends one or several subscription requests 911 to the ODS processor 125 serving its IT Domain. Such requests contain the IDs of the IT Components that the domain processor is interested in, as a means of maintaining its IT Aggregates. Based on its mapping table as described further on in this narrative, the ODS processor forwards the subscription requests 912 to the service processors 130, 130*z* owning those IT Components. As a result, each service processor will abstract and propagate to the registered domain processor 120 all the IT Component events 904 where the related IT Component is one of those the domain processor has subscribed to. At initialization or when a transaction object is added or updated, a service processor 115 sends one or several subscription requests 913 to the ODS processor 125. Such requests contain the IDs of the IT Aggregates the domain processor is interested in, as a means of maintaining a snapshot of the IT resources supporting the execution of transactions. Based on its mapping table as described further on in this narrative, the ODS processor forwards the subscription requests 914 to the domain processors 120 owning those IT Aggregates. As a result, each domain processor will abstract and propagate to the registered service processor 115 all the IT Aggregate events 905 where the related IT Aggregate is one of those the service processor has subscribed to.

At initialization or when a maintenance period ends, a service processor 115 queries 915, 916 the ODS processor 125 to determine which processors should be contacted for a given STEAD request. Then the service processor pushes sub-requests 906 to those servers 130*z* that will then return events 909 related to each execution cycle.

Figure 11:
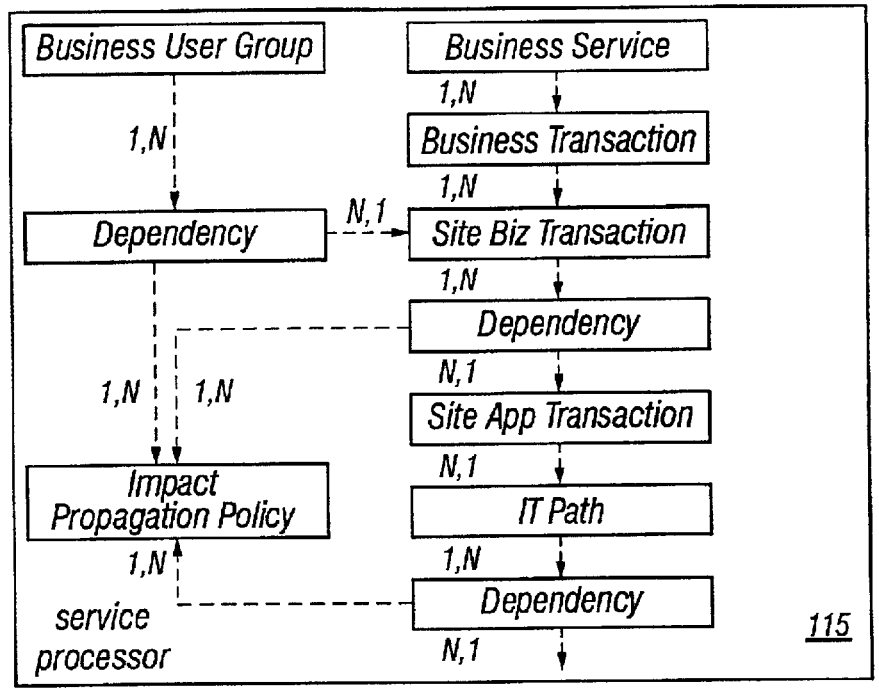
FIG. 11 depicts a high-end chart distributed data model according to the present invention.
Figure 12:
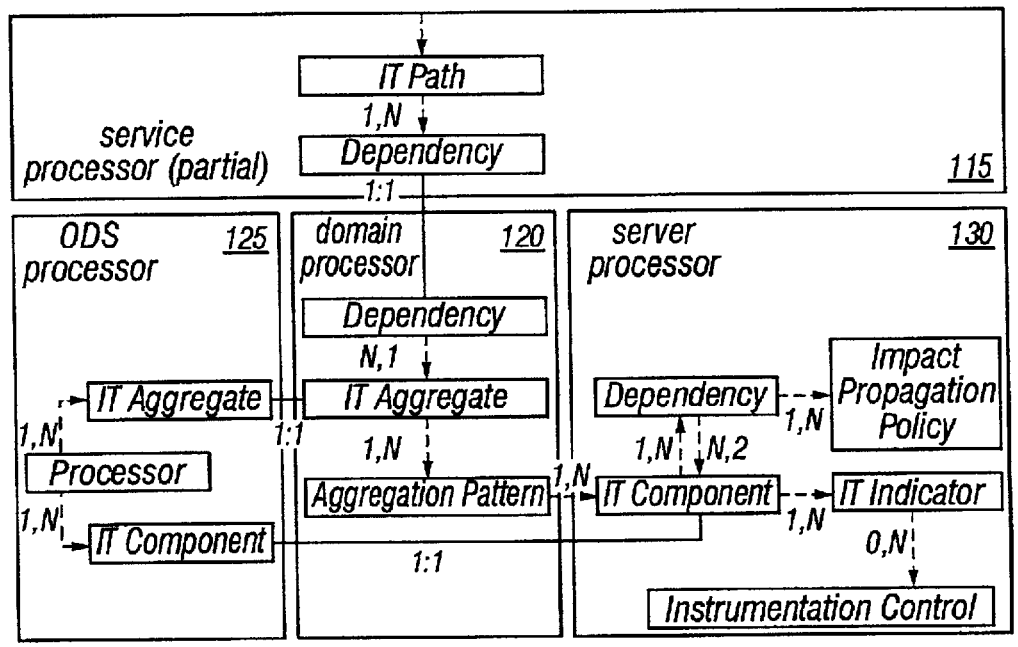
FIG. 12 depicts a low-end distributed data model according to the present invention.

As depicted in FIG. 11, the high-end of the distributed data model supporting the aforementioned three-layer functional architecture is shown. This upper block presents the data structures stored and maintained in the service processors 115. Turning to the low-end of the distributed data model shown in FIG. 12, the left bottom block relates to the ODS processors 125; the middle bottom block to the domain processors 120; and the right bottom block to the service processors 130. By default, each ODS processor should have an entry for all the IT Aggregates respectively for all the IT Components existing in the various domain processors respectively for all the various service processors of the given backbone. However, nothing prevents from a technical stand point to split the backbone in several logical areas with one ODS server per area. ODS servers just need then to automatically forward unmatched requests to their peers.

Figure 13:
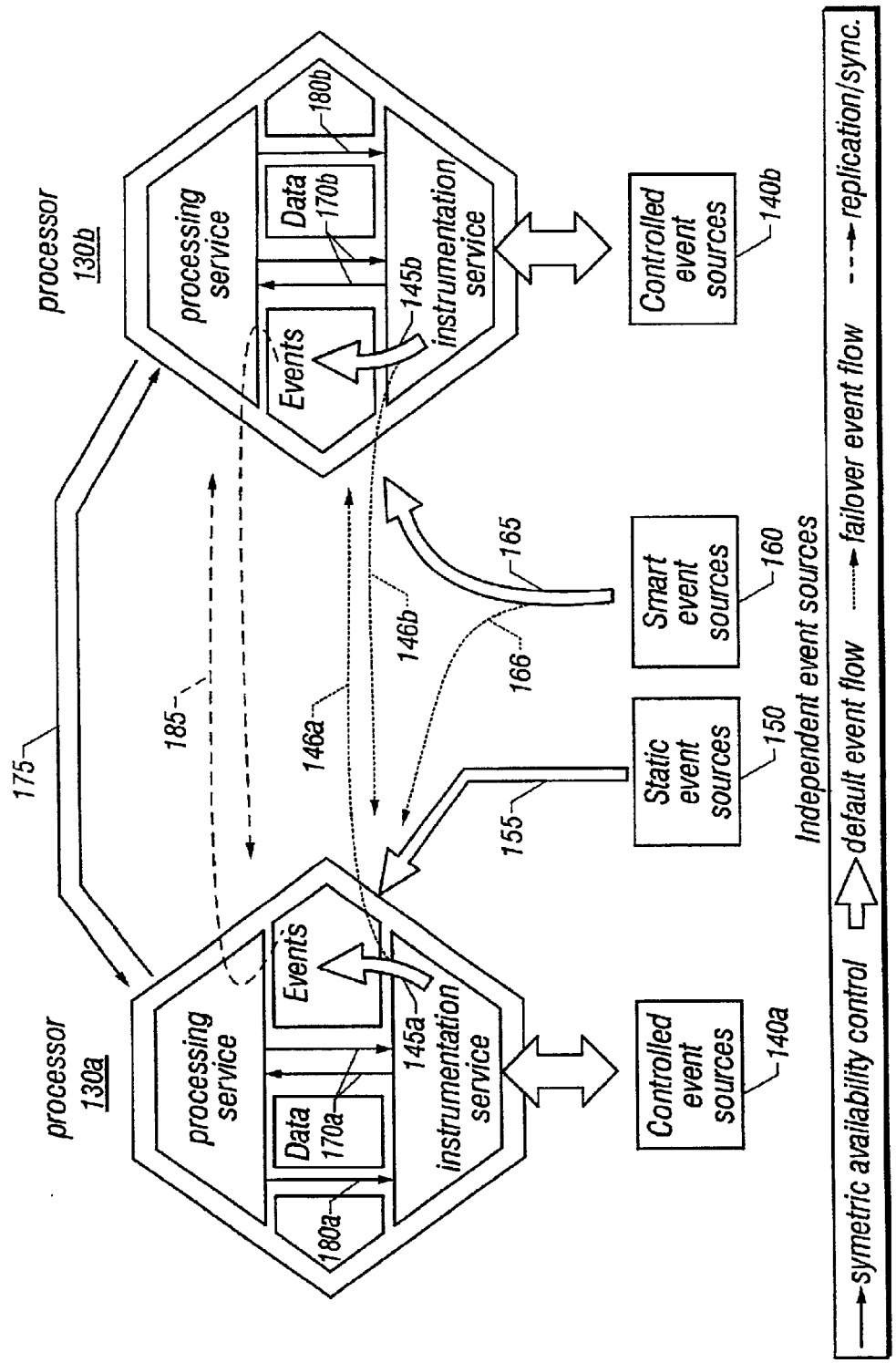
FIG. 13 depicts a high availability scheme chart with the Management Backbone.

FIG. 13 depicts the High Availability scheme coming with the Management Backbone. As an example, two service processors are shown. Taking advantage of the peer-to-peer build-in capabilities, the first processor 130a is configured to act as an active backup for the second processor 130b which in turn acts as an active backup for the first one 175. Notably, asymmetric backup configurations are possible. A backup processor maintains a dormant copy of the resources managed by its peer and, during the normal course of operations, the events related to those resources are propagated from the peer to the backup and automatically synchronized 185.

In each processor, the processing service and the instrumentation service monitor themselves reciprocally 170. If the processing service detects that the instrumentation service is not available anymore, it attempts to restart it. In case the instrumentation service fails to restart, the processing service notifies the backbone administrator. If the instrumentation service detects that the processing service is not available anymore, it attempts to restart it for a first cycle. In case the processing service fails to restart, the instrumentation service automatically redirects the flow of events for a second cycle from 145 the local processing service to 146 the processing service of the backup processor. If the backup detects that the processing service of its peer is not responding for two consecutive cycles, it activates the dormant copy of the resources of the peer, takes ownership for them, and informs the ODS processor to switch the processor names in its tables. The ODS processor then notifies the other processors of the IT Domain(s) it is associated to, plus the other ODS processors, if any.

Based on this scheme, controlled event sources 140 and smart event sources 160 will not be affected by a non-recoverable failure of the processing service in a processor. Only the information coming from static event sources might be lost or buffered, if they do not support dual delivery or if this option is dismissed for performance reasons. In addition, when the instrumentation service of a processor experiences a non-recoverable failure, the local processing service may request the one from the backup processor to operate on an assistance mode. In this situation, the processing service of the backup first tags those of its dormant resources that normally rely on the instrumentation service of the peer. Then, it triggers 180 local instrumentation functions to monitor the tagged resources. Eventually it propagates the resulting events to the peer in order to be processed. With this mode, the first processor keeps the ownership on its resources, such that only the monitoring actions are subcontracted to the backup. Resources of low importance or resources that cannot be monitored by the backup may be excluded from this mode by using a static marker.

Figure 14:
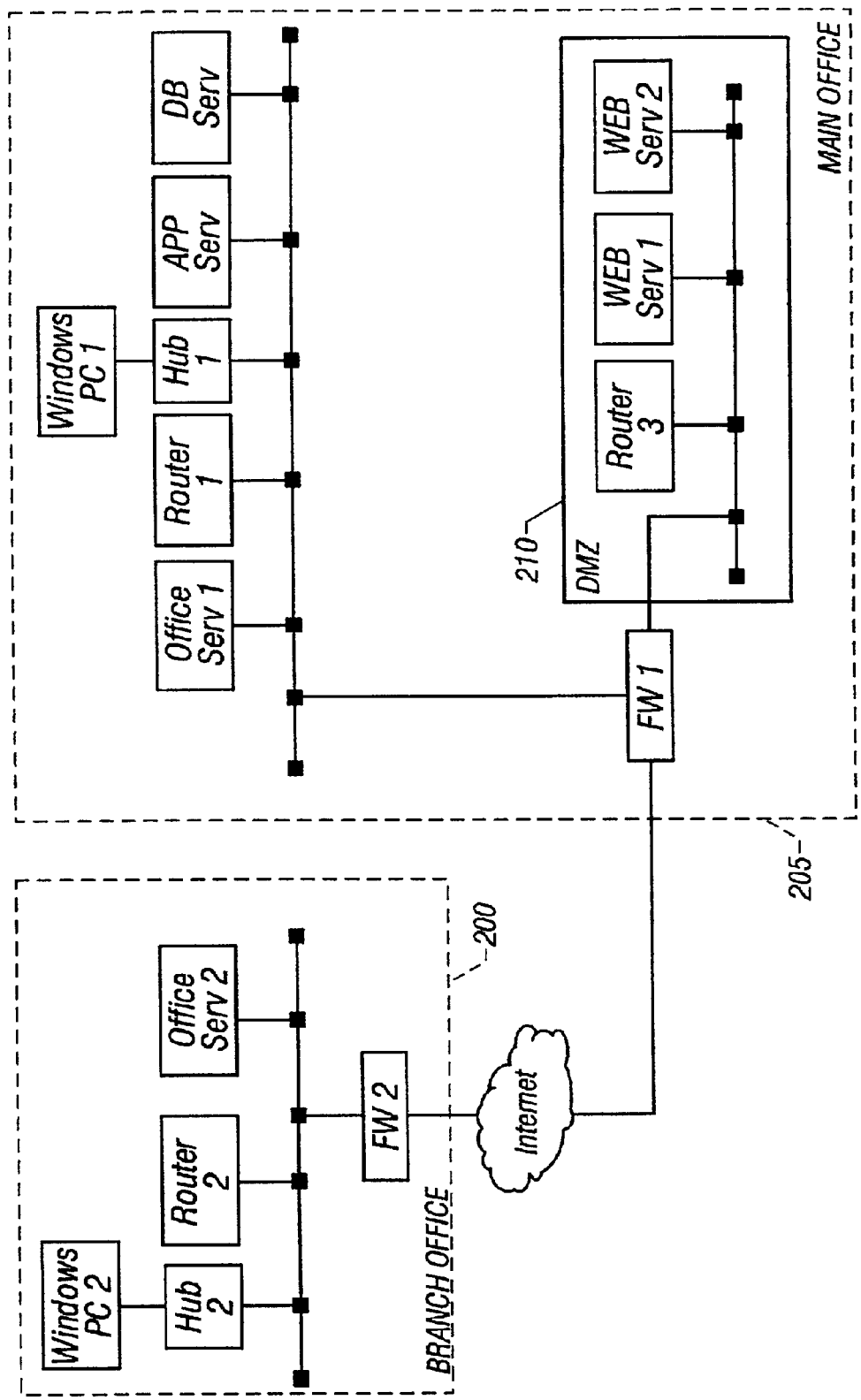
FIG. 14 depicts the IT Infrastructure chart of a representative company where the present invention or e-Solution may be implemented.
Figure 15:
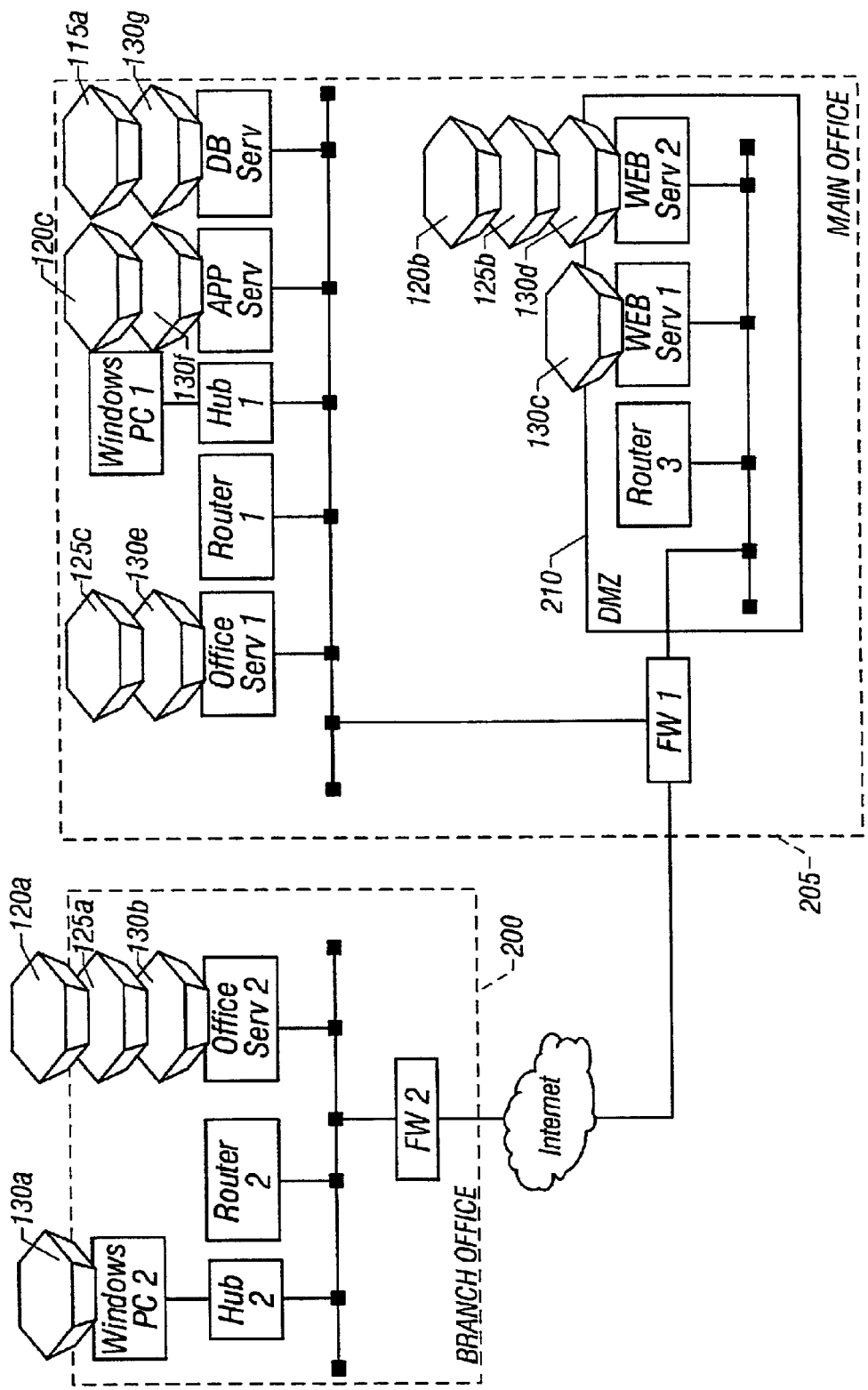
FIG. 15 depicts a possible setup chart for the processors at the representative company according to the present invention.

The IT Infrastructure of a representative company is shown in FIG. 14 as implementing the system and method of the present invention. This company is shown as having a main office 205 and a branch office 200. The central application server and database server reside on the internal network of the main office. Separated from the internal network by a firewall is a demilitarized zone (DMZ) 210 with two Web servers. Depending on the type of service being used, the users in the main office directly access the application server or first bounce off the Web servers. Users in the branch office can only access the application services through the Web servers;

A possible setup for the processors at the representative company is depicted in FIG. 15. All the servers receive a service processor 130b–130g. An ODS processor is installed on each of the two offices internal networks 125a and 125c, and a third one 125b goes in the DMZ. A similar layout is adopted for the domain processors 120a–120c and a service processor 115a is installed at the main office.

Figure 16:
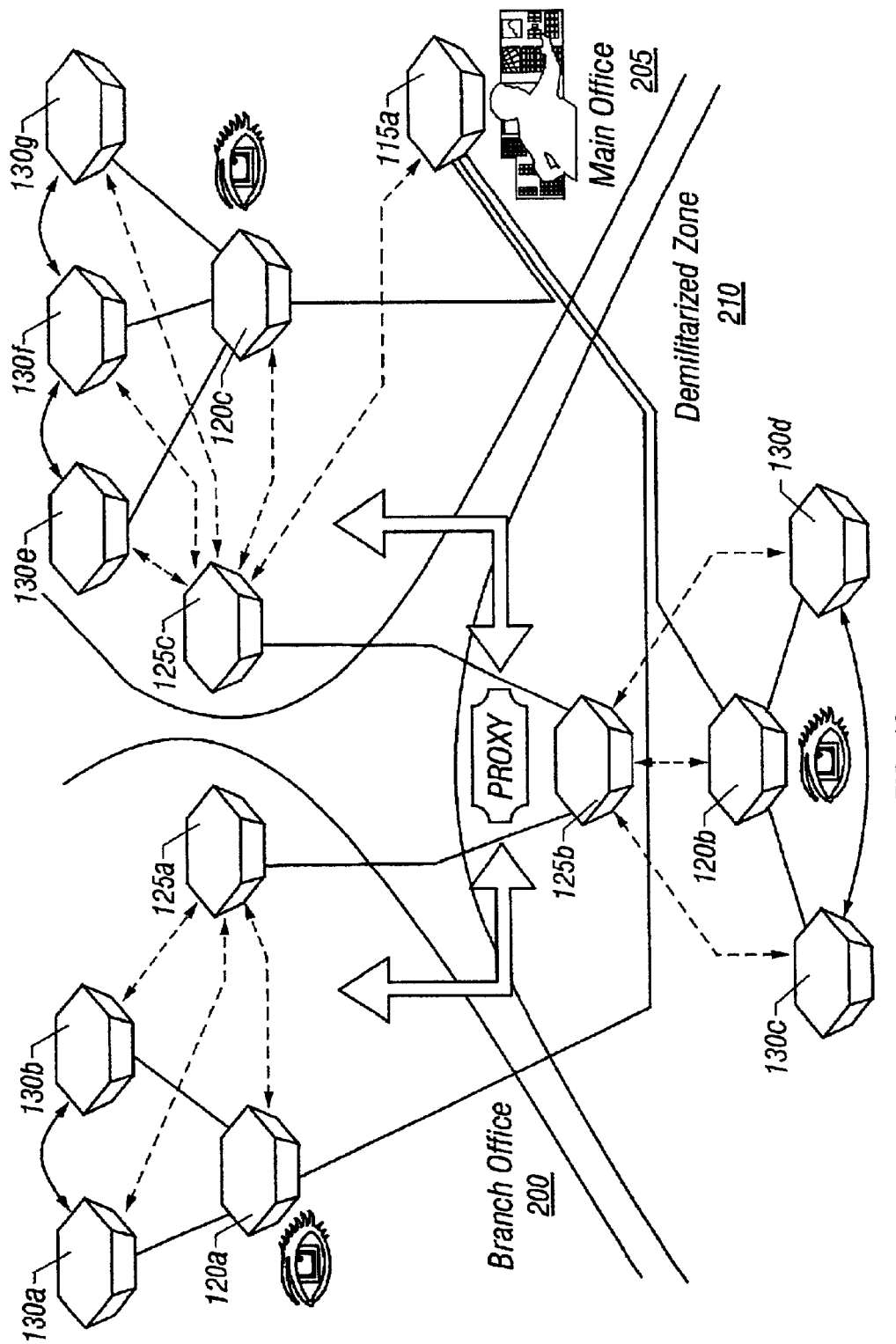
FIG. 16 depicts a resulting management backbone chart at the representative company according to the present invention.

The resulting Management Backbone at the representative company is shown in FIG. 16. Service processors 130a–130g are combined in symmetric backup configurations and associated to one of the three IT Domains: main office, DMZ, or branch office. Each domain processor 120a–120c obtains directory services from the local ODS processor 125a–125c and delivers aggregated IT information to the service processor 115a.

Figure 17:
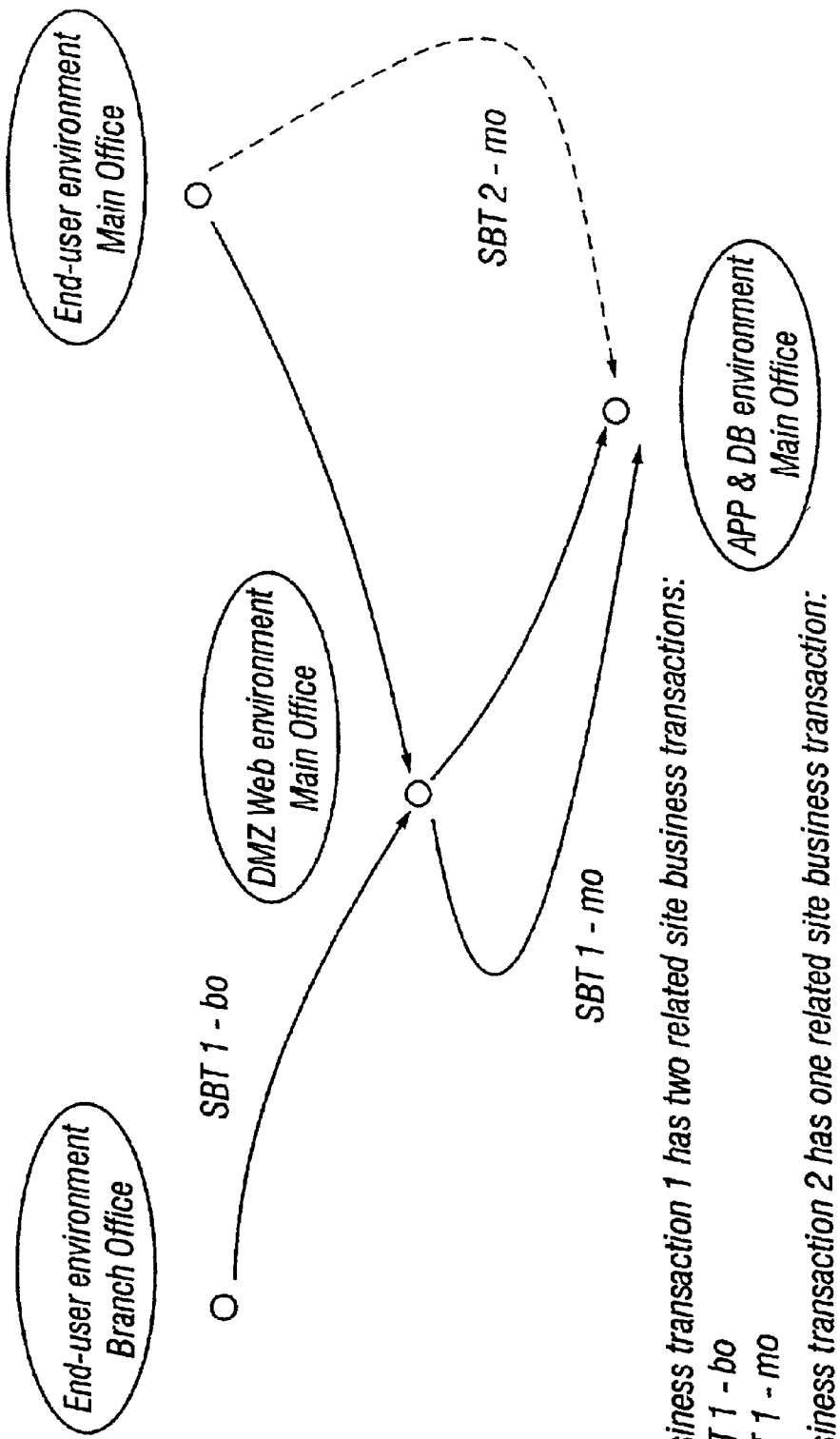
FIG. 17 depicts three representative site business transactions at the representative company.

FIG. 17 depicts three site business transactions (SBT) at the representative company. One SBT 1-bo corresponds to the business users of the branch office submitting a sequence of site application transactions through a web interface. Another one SBT 1-mo corresponds to the business users of the main office submitting a sequence of site application transactions through a web interface. The last one SBT 2-mo corresponds to the business users of the main office submitting a sequence of site application transactions directly through a proprietary client. In this example, the two first SBT relate to the same business transaction BT 1 while the third one relates to another business transaction BT 2.

Figure 18:
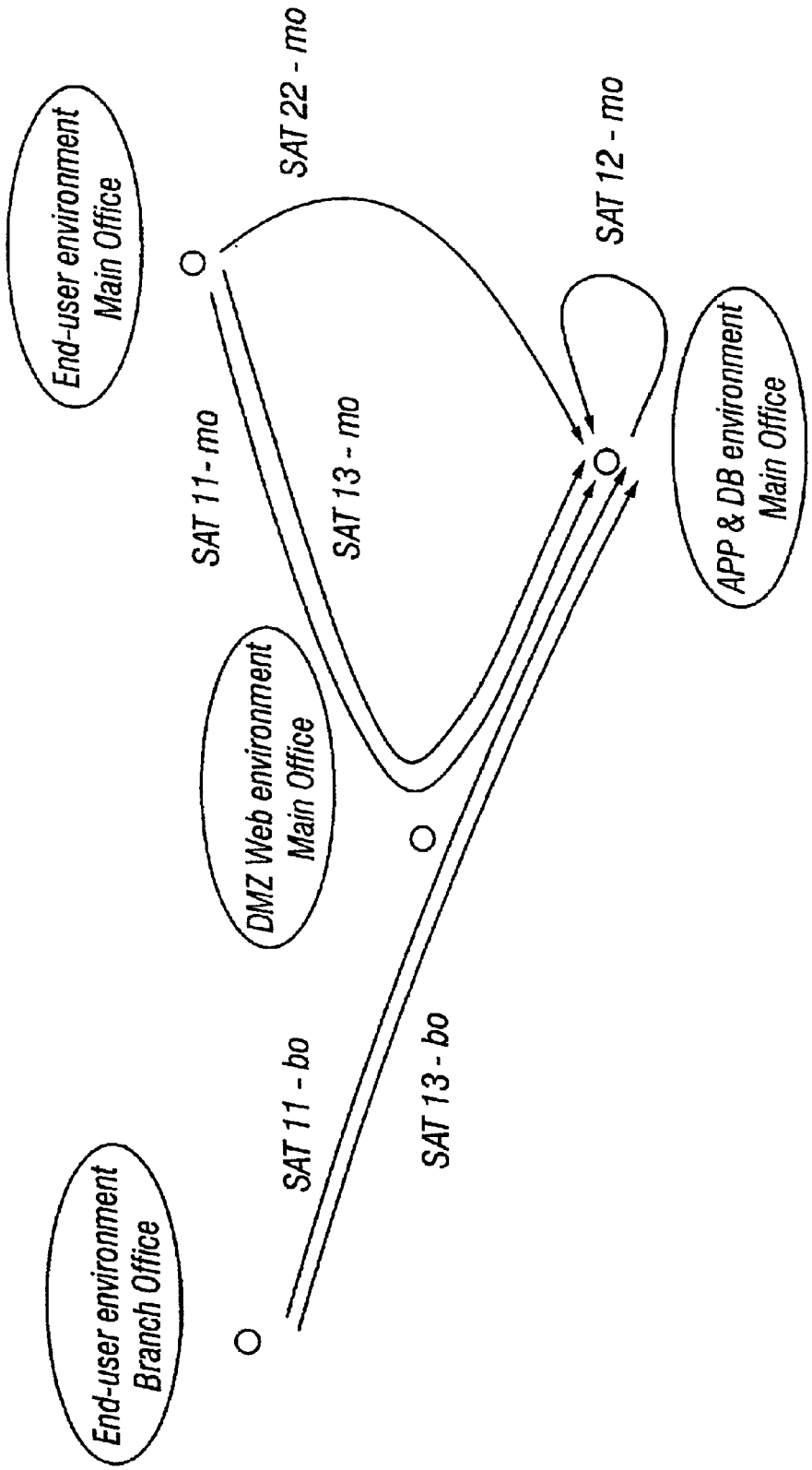
FIG. 18 depicts the six site application transactions supporting the three site business transactions at the representative company.

Six SATs support the three-site business transactions (SBT) at the representative company in FIG. 18. The SBT 1-bo (shown in FIG. 17) is made of SAT 11-bo, SAT 12-mo, and SAT 13-bo. The site business transaction SBT 1-mo is made of SAT 11-mo, SAT 12-mo, and SAT 13-mo. The site business transaction SBT 2-mo is made of SAT 22-mo.

Figure 19:
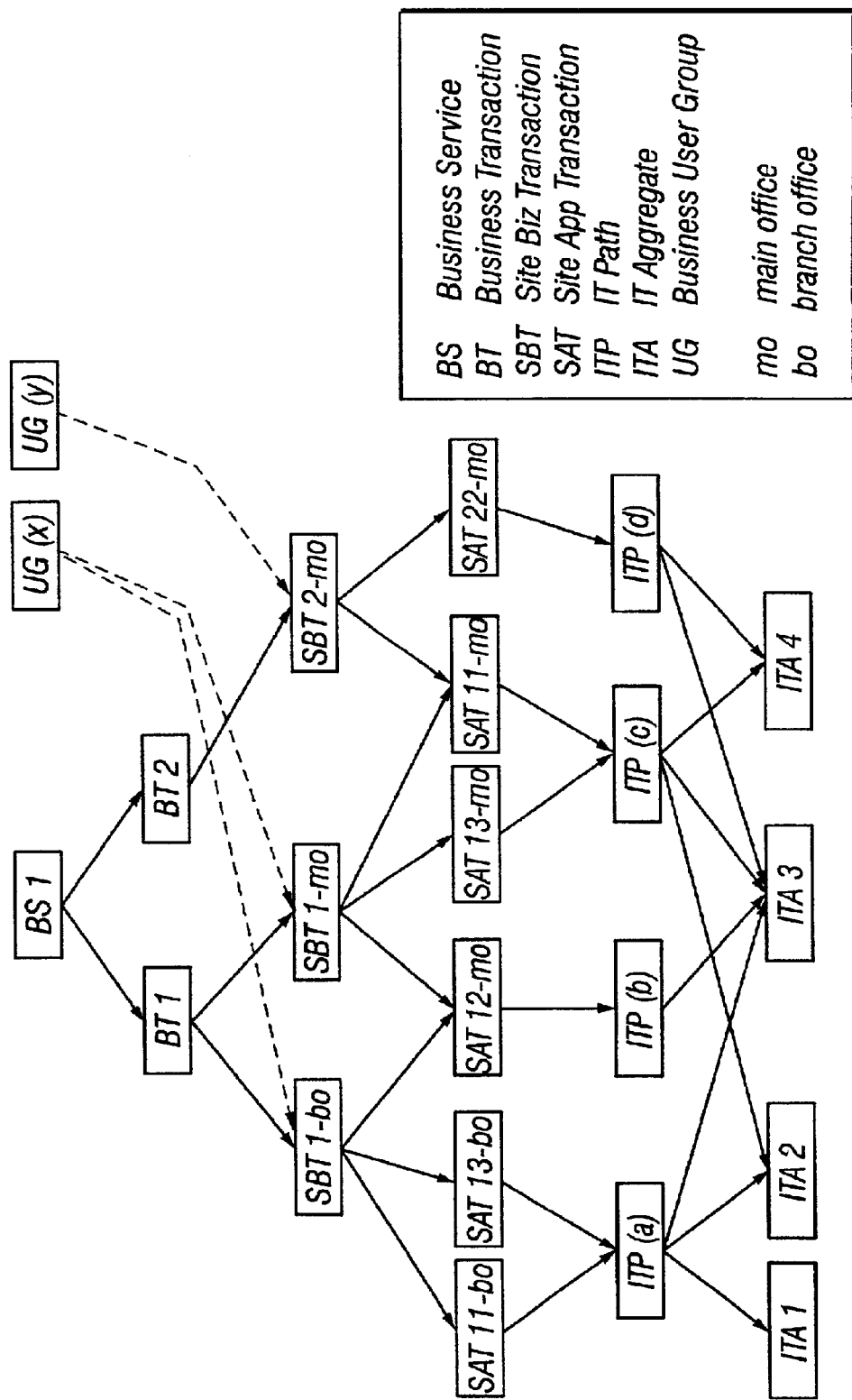
FIG. 19 depicts a logical tree chart of the resources at the representative company according to the present invention.

The logical tree of the resources at the representative company is shown in FIG. 19. The tree goes from the business service at the top down to the IT Aggregates. It shows also how business user groups relate to site business transactions. As illustrated, site business transactions can share some site application transactions. In turn, SATs can share the same IT Path which in turn can share some IT Aggregates with other IT Paths.

Figure 20:
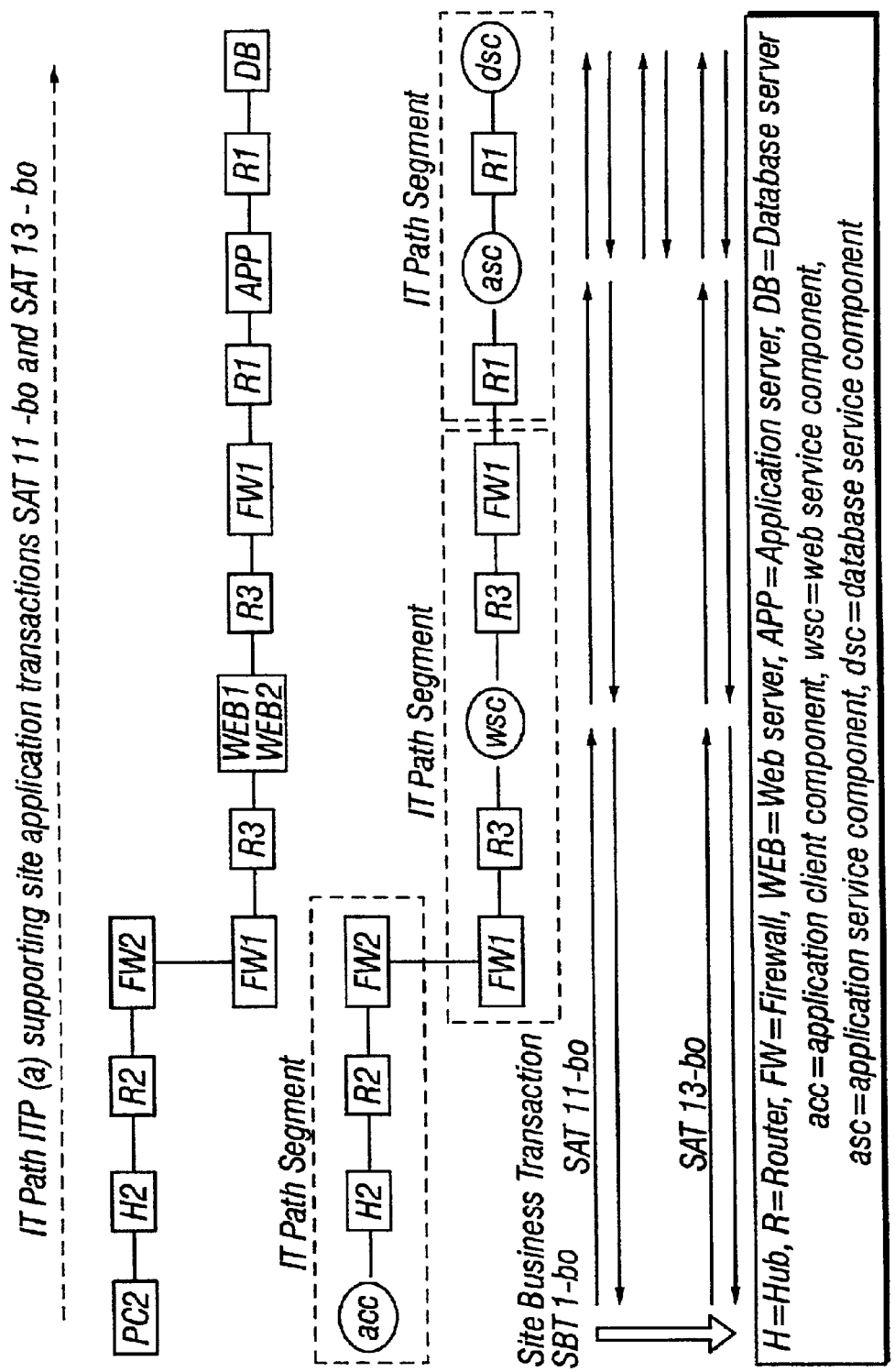
FIG. 20 provides an end-to-end representation of the first IT Path at the representative company.
Figure 21:
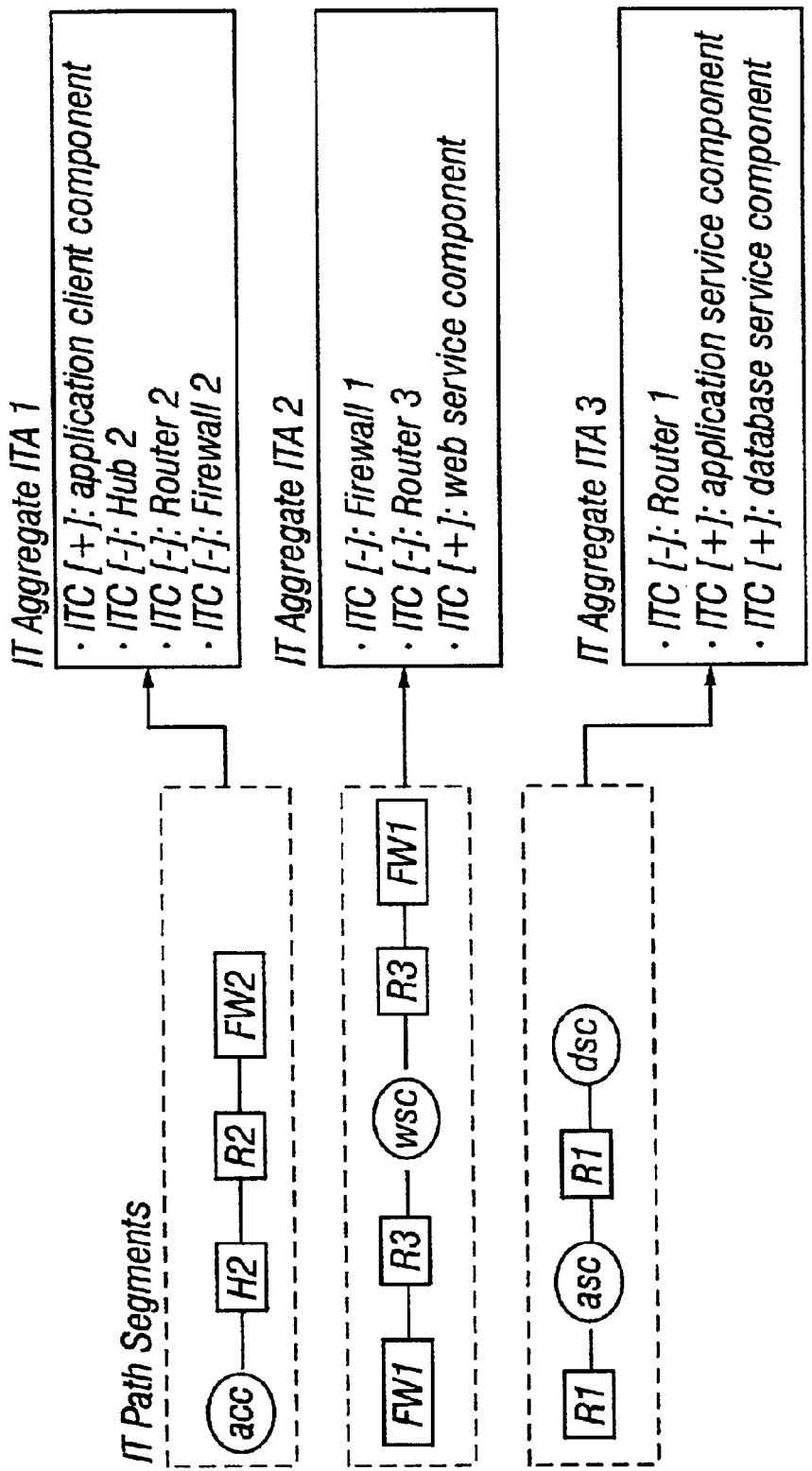
FIG. 21 depicts an IT Aggregates chart in the first IT Path at the representative company according to the present invention.
Figure 22:
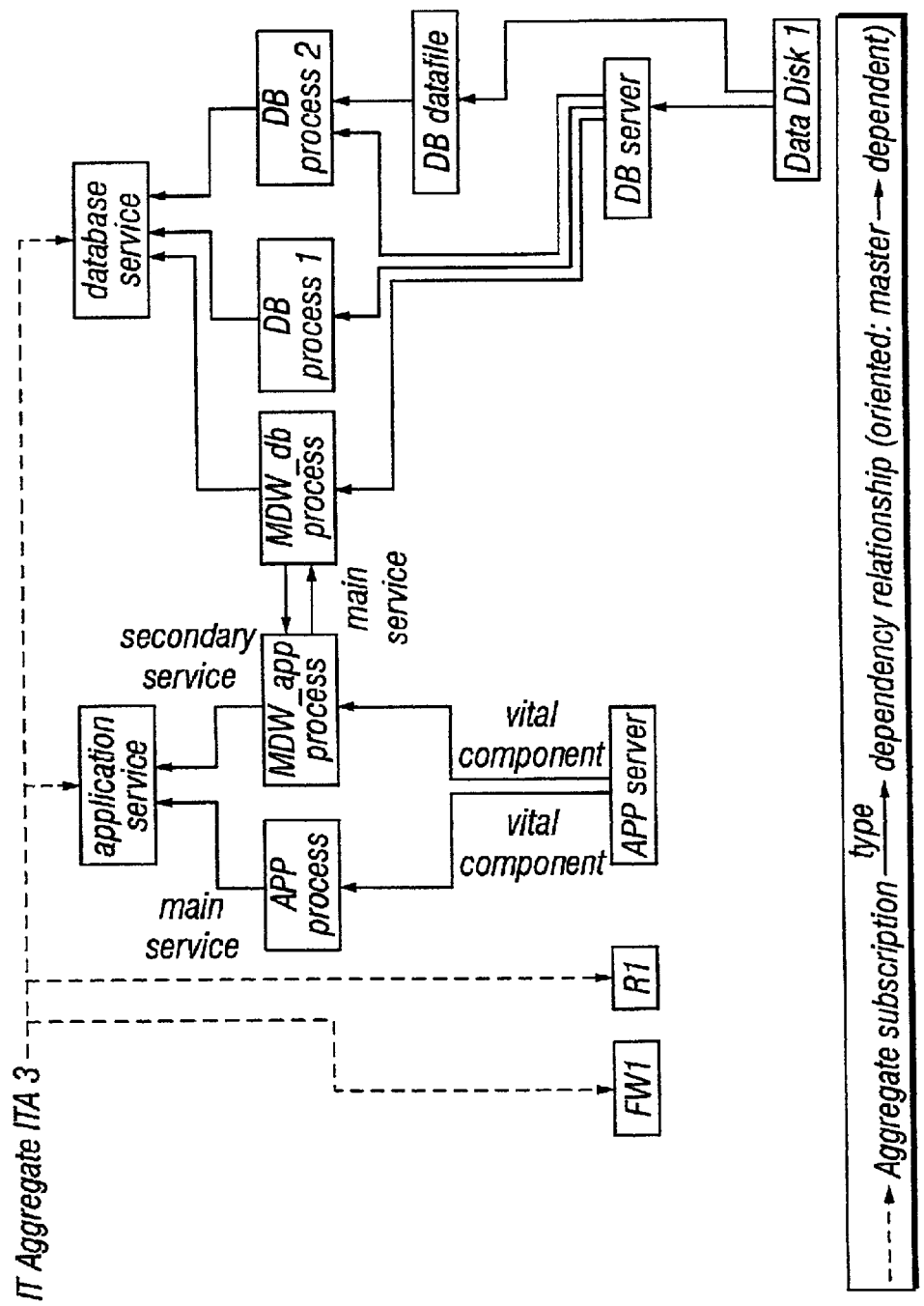
FIG. 22 depicts the underlying IT components and dependencies chart for one of the IT Aggregates at the representative company according to the present invention.

An end-to-end representation of the IT Path ITP (a) at the representative company is depicted in FIG. 20. This IT Path supports the site application transactions SAT 11-bo and SAT 13-bo, which are part of the site business transaction SBT 1-bo. SBT 1-bo is an instantiation of the business transaction BT 1, which belongs to the business service BS 1. Turning to FIG. 21, the IT Aggregates are shown in the IT Path ITP (a) at the representative company. The split of the IT Path into several IT Aggregates is arbitrary but, from a general perspective, it should comply with the IT Domains division;

FIG. 22 depicts the underlying IT Components and dependencies for one of the IT Aggregates at the representative company. The IT Aggregate ITA 3 is owned by the domain processor 120c of the main office and is associated to four IT Components: 'FW1', 'R1', 'application service,' and 'database service'. As a result, a subscription has been made on the three service processors 130e–130g maintaining those IT Components in order to have any related events forwarded to the domain processor. While the two first IT Components are not involved in any relationship, the two others are in fact non-instrumented logical objects combining the events of various other IT Components through cascaded dependencies. For example, the application service component depends on the 'APP process' as a main service and on the 'MDW_app process' as a secondary service. Those two components in turn depend on the 'APP server.' As explained with respect to FIG. 25 and illustrated in FIG. 26, typed dependencies imply specific propagation policies. Also, dependencies can link components 'horizontally' and across the processor boundaries like the bi-directional relationship between the 'MDW_app process' component (owned by 130f) and the 'MDW_db process' component (owned by 130g).

Figure 23:
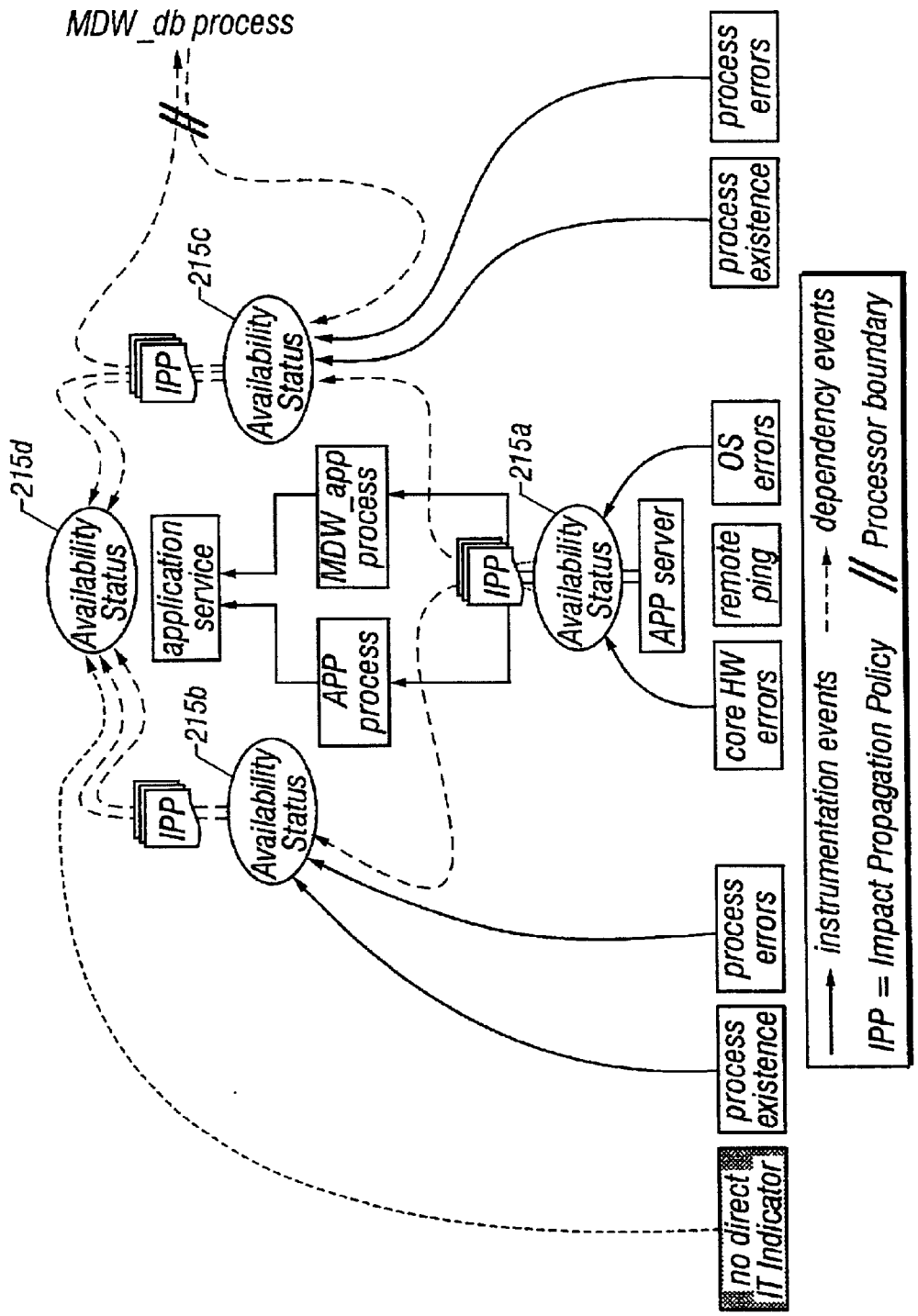
FIG. 23 depicts a set of IT Indicators chart providing availability information about interrelated IT Components at the representative company according to the present invention.

FIG. 23 depicts a set of IT Indicators providing availability information about interrelated IT Components at the representative company. Each IT Indicator encompasses a range of instrumentation event(s) in the availability discipline and for a given IT Component. For example, the availability status 215b of the IT Component 'APP process' is the product of (i) the instrumentation events issued by the two associated IT Indicators 'process existence' and 'process errors', and (ii) the dependency events resulting from the Dependency on the 'APP server' component.

Figure 24:
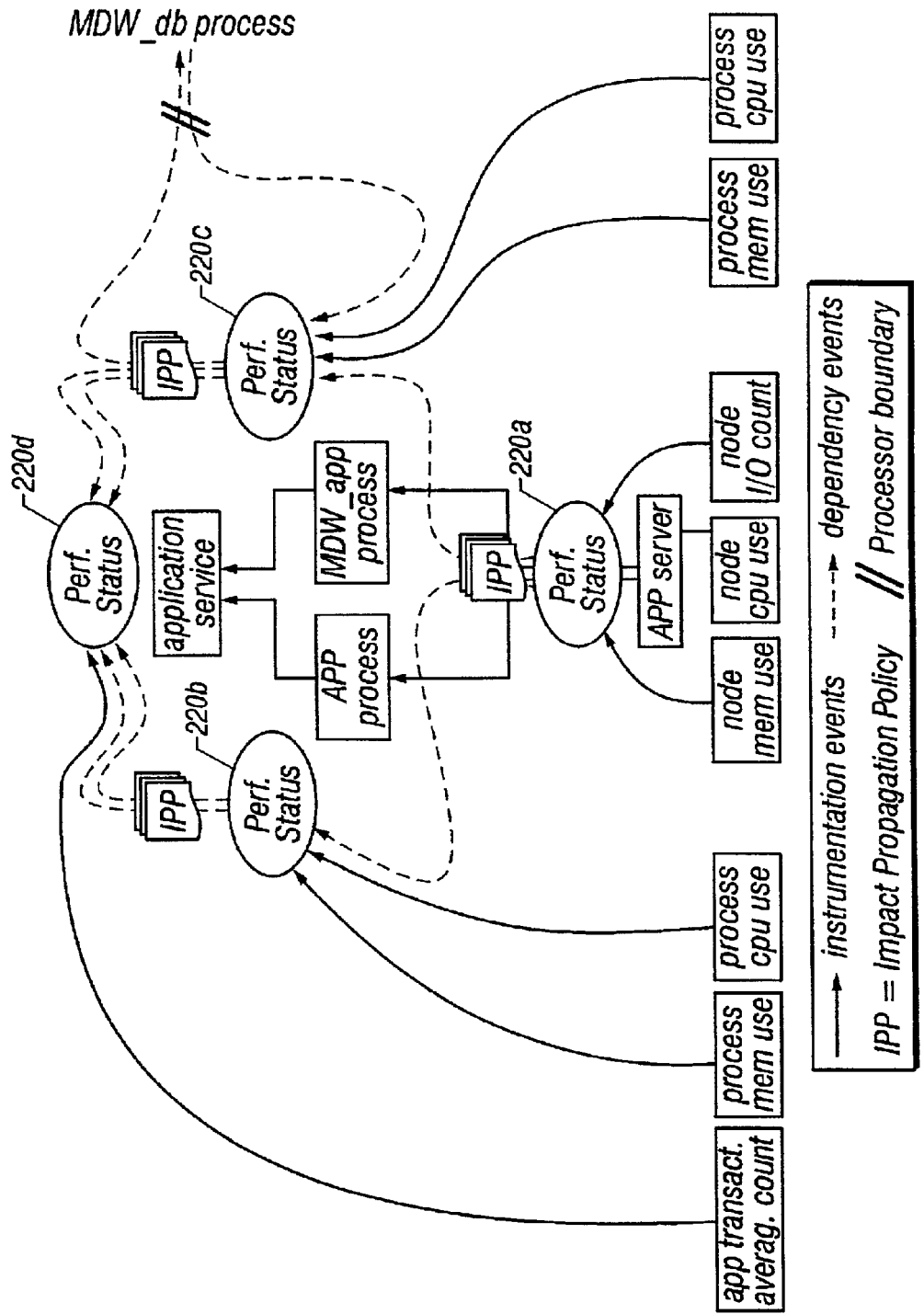
FIG. 24 depicts a set of IT Indicators chart providing performance information about interrelated IT Components at the representative company according to the present invention.

Referring to FIG. 24, a set of IT Indicators providing performance information about interrelated IT Components at the representative company is shown. Each IT Indicator encompasses a range of instrumentation event(s) in the performance discipline and for a given IT Component. For example, the performance status 220c of the IT Component 'MDW_app process' is the product of (i) the instrumentation events issued by the two associated IT Indicators 'process mem use' and 'process cpu use', and (ii) the dependency events resulting from the dependencies on the 'APP server' component and the 'MDW_db process' component.

Referring again to FIG. 25, some Impact Propagation Policies at the representative company are shown. The relationship between the 'MDW_app process' component and the 'application service' component in FIG. 22 is an example where one is a secondary service for the other one. This relationship is governed by the Impact Propagation Policy 6. Thus, when an instrumentation event (bsi) occurs for the 'MDW_app process', the first table determines whether it has to be propagated as a dependency event (bsd) to the 'application service.' By default, a FATAL bsi event translates into a WARNING bsd event. Bsi events with a lower severity are usually not propagated. When a dependency event occurs for the 'MDW_app process' as a consequence of an upstream dependency, the second table determines whether it has or not to be propagated as a new dependency event to the 'application service'. Any bsd event with a severity equal to CRITICAL or FATAL translates into a WARNING bsd event. Bsd events with a lower severity are not propagated. Tables, i.e. policies, are stored in the data repository of the processors. In a preferred system, these tables and the policies contained therein may be modified in real-time.

Figure 26:
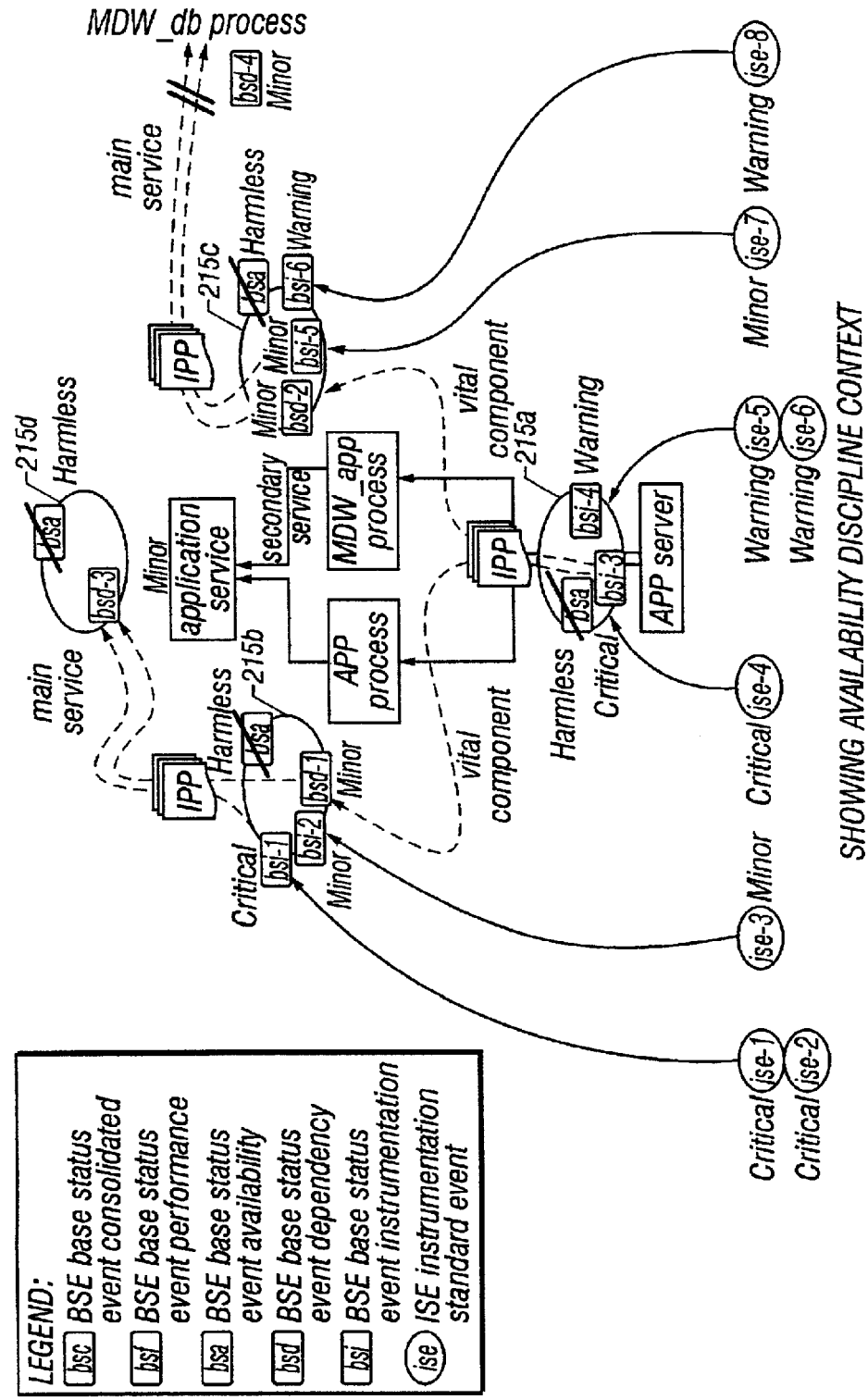
FIG. 26 depicts an impact propagation case chart at the representative company according to the present invention.
Figure 27:
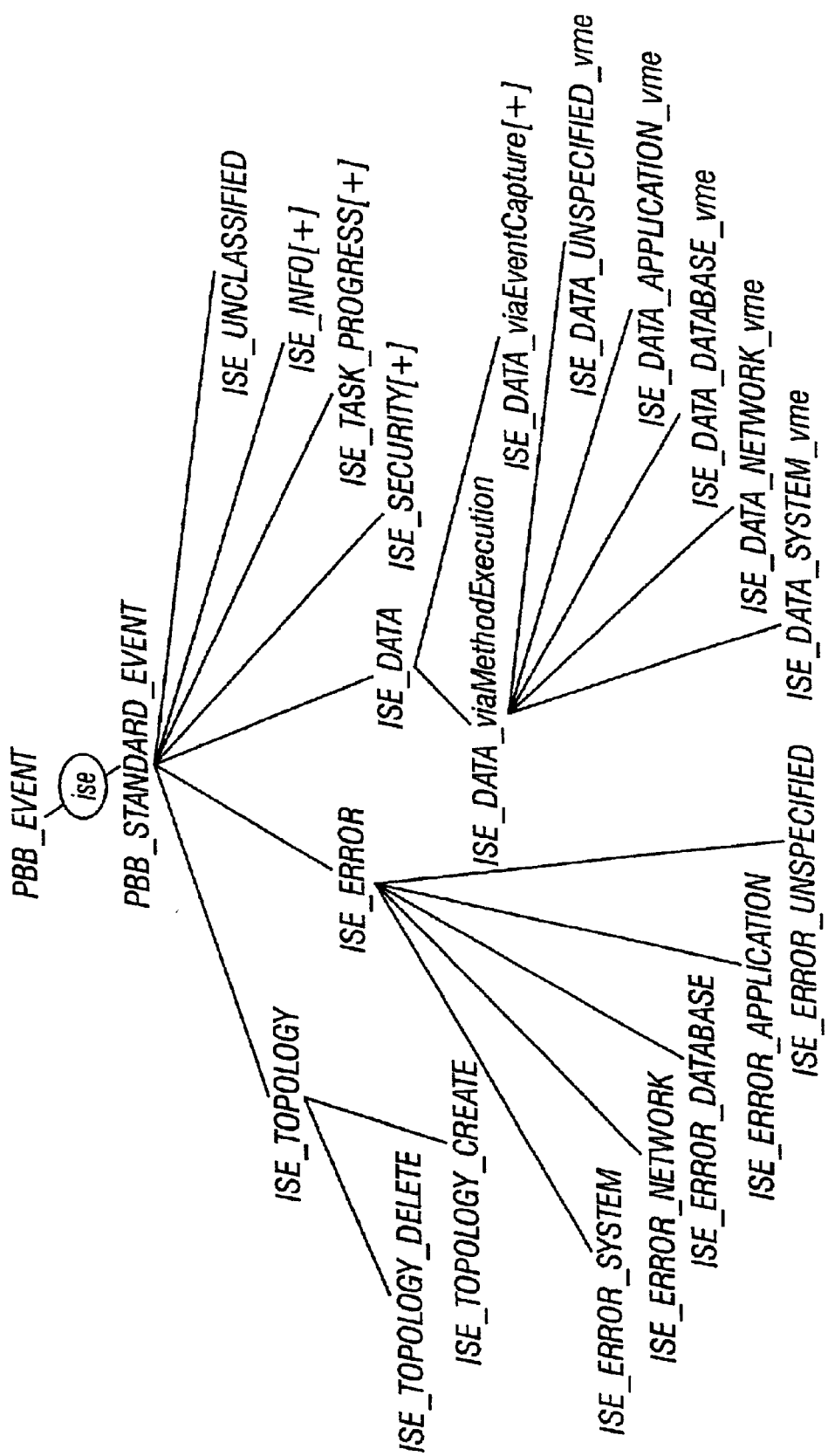
FIG. 27 depicts a partial view instrumentation standard event hierarchy chart according to the present invention.
Figure 28:
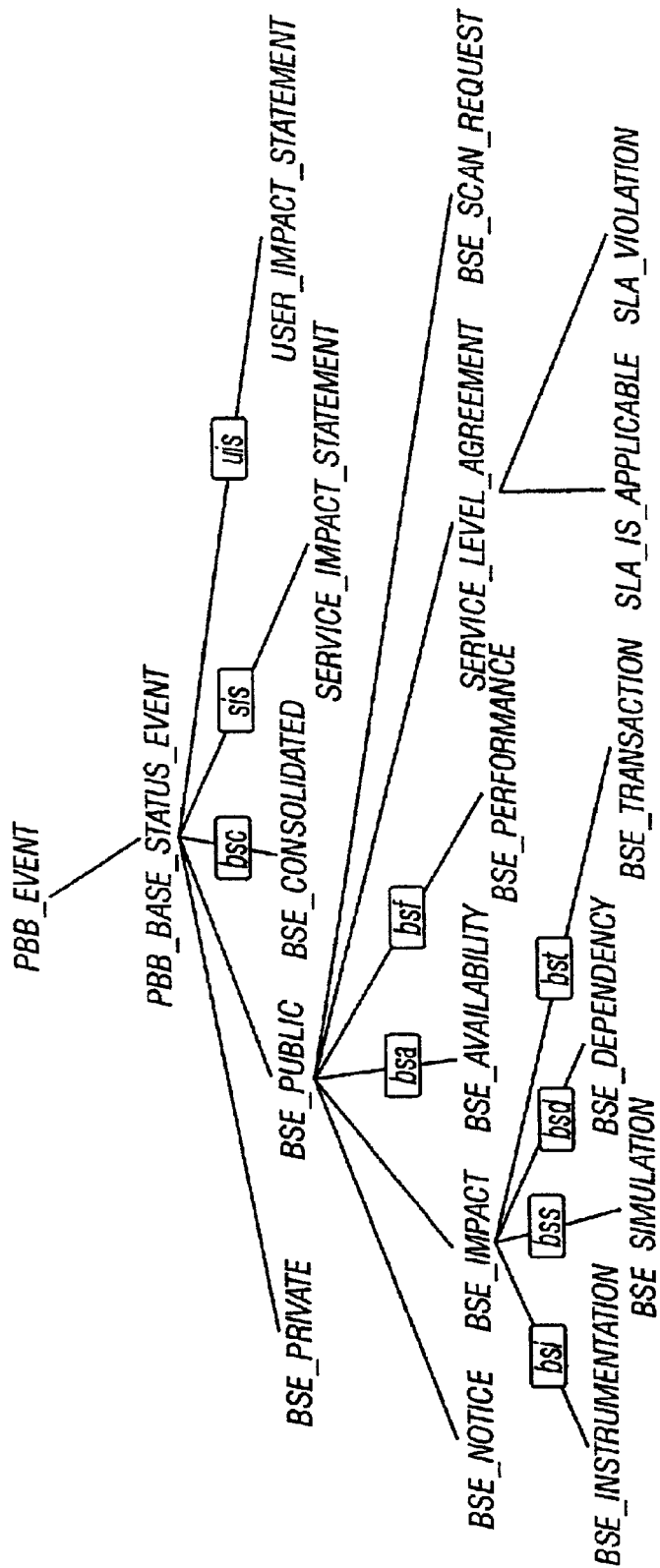
FIG. 28 depicts a partial view base status event hierarchy chart according to the present invention.

FIG. 26 depicts an impact propagation case at the representative company involving availability events. Instrumentation standard events (ise) issued by the IT Indicators are abstracted into instrumentation events (bsi) for the related IT Components, using the severity as a means to group events. Looking at the 'APP process' component for example, ise-1 (CRITICAL) and ise-2 (CRITICAL) both abstract into bsi-1 (CRITICAL) while ise-3 (MINOR) abstracts into bsi-2 as this severity is different. Similarly, the 'APP server' has the ise-4 abstracted into bsi-3 (CRITICAL) and the two ise-5 and ise-6 abstracted into the same bsi-4 (WARNING). As the 'APP server' is a vital component for the 'APP process', bsi-3 is abstracted into bsd-1 (MINOR) based on the Impact Propagation Policy 2 (shown in FIG. 25), but bsi-4 is not abstracted because of its lower severity. In addition, as the 'APP process' is a main service for the 'application service' component, bsi-1 (CRITICAL) is abstracted into bsd-3 (MINOR) based on the Impact Propagation Policy 5, but bsi-2 is not abstracted because of its lower severity. Despite it has the same severity than bsi-2, bsd-1 is abstracted into bsd-3 (open by bsi-1) because Impact Propagation Policy 5 takes into account the severity MINOR for the dependency events. In conclusion, all the ise events shown at the bottom of the figure eventually lead to a single bsd-3 MINOR dependency event at the 'application service' level. This outcome could be different with modified IPP policies;

In FIG. 27, the Instrumentation Standard Event (ISE) hierarchy is depicted in a partial view. These ISE event structures are used by the IT Indicators to deliver standardized information regardless of event source. Turning to FIG. 28, the Base Status Event (BSE) hierarchy is shown in a partial view. These BSE event structures are used throughout the Management Backbone as a means to carry the necessary information for determining the base status of the managed resources such as IT Components, IT Aggregates, IT Paths, SAT, BST, business user groups, and Business Services. The base status of a given resource is the highest severity among those of the open BSE_IMPACT (bsi, bss, bsd, bst), BSE_AVAILABILITY (bsa), and BSE_PERFORMANCE (bsf) events which relate to that resource.

The model enforces the following preferred principles for IT Components. First, a resource can have up to 4 bsi events open at the same time (one per severity value: WARNING, MINOR, CRITICAL, FATAL) in each discipline. Next, a resource can have up to 4 bsd events open at the same time (one per severity value: WARNING, MINOR, CRITICAL, FATAL) in each discipline. Moreover, a resource can have only 1 bsa event open at once in the availability discipline. In addition, a resource can have only 1 bsf event open at once in the performance discipline. Furthermore, in the availability discipline, bsi/bsd events (on one side) and the bsa event (on the other side) are mutually exclusive when open. In the performance discipline, bsi/bsd events (on one side) and the bsf event (on the other side) are mutually exclusive when open. Finally, by definition, event collectors associated to the resources will only display open bsi, bsd, bsa and bsf events.

The same principles apply for IT Aggregates, IT Paths, BST, and Business Services, with the exception of bsi events which cannot occur at those levels. The same principles apply for SAT, with bst events in place of bsi events. In addition, for IT Aggregates and IT Paths, a resource can have up to 4 bss events open at the same time (one per severity value: WARNING, MINOR, CRITICAL, FATAL) in each discipline.

The consolidated status carried in BSE_CONSOLIDATED events (bsc) is derived from the severity values on a per-resource basis, with: two HARMLESS events (one per discipline: bsa+bsf) translating into OPERATIONAL; any combination of events reaching but not exceeding the severity range [WARNING, MINOR] translating into OPERATIONAL_WITH_INCIDENTS; and any combination of events reaching the severity range [CRITICAL, FATAL] translating into NOT_OPERATIONAL.

Figure 29:
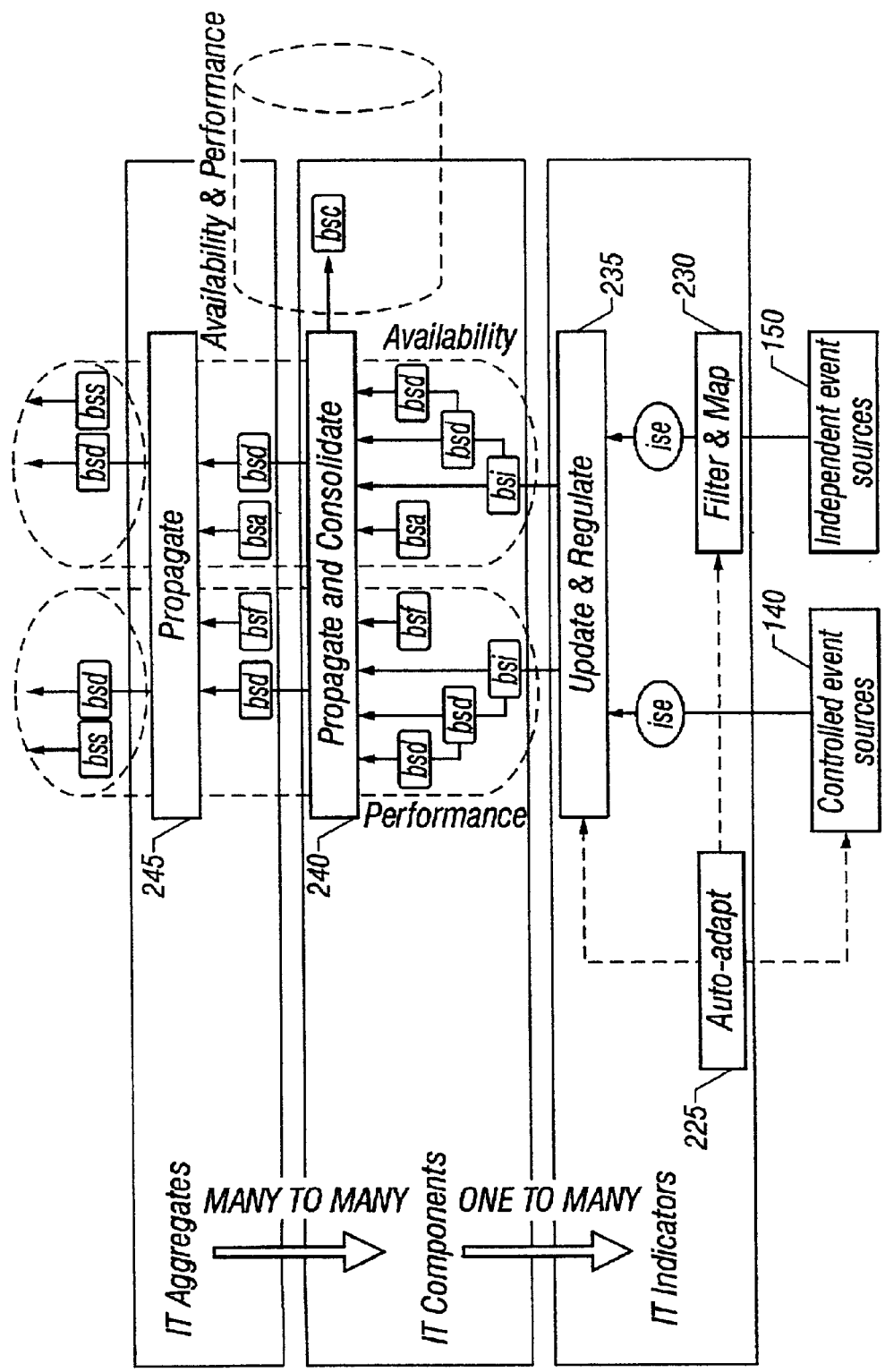
FIG. 29 depicts an event processing steps chart from the instrumentation level up to the IT Aggregate level according to the present invention.
Figure 30:
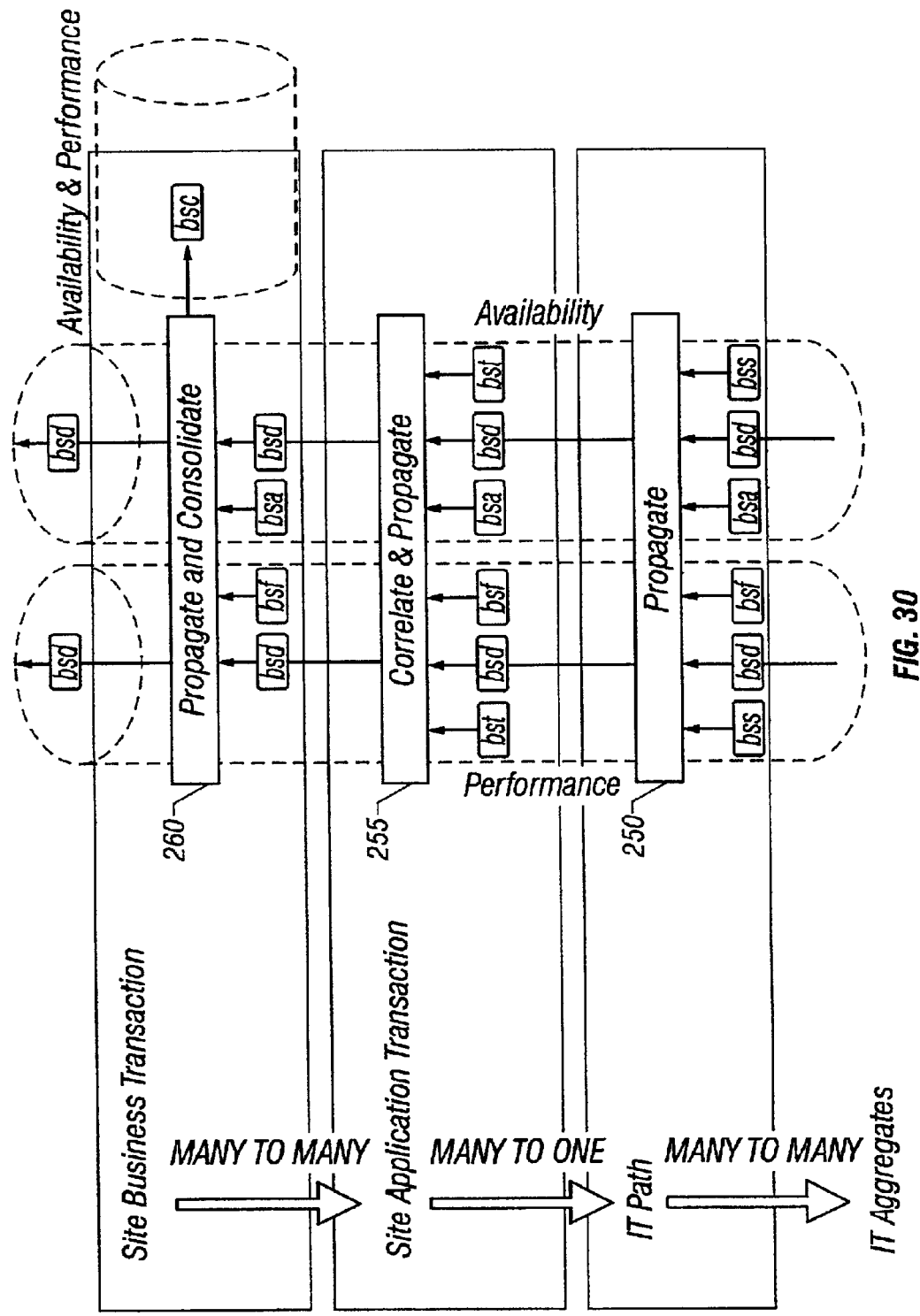
FIG. 30 depicts an event processing steps chart from the IT Aggregate level up to the site business transaction level according to the present invention.

The impact statement carried in SERVICE_IMPACT_STATEMENT (sis) and USER_IMPACT_STATEMENT (uis) events is derived, like the consolidated status, from the severity values on a per-service or per-user group basis, with three possible statements: NO_IMPACT_REPORTED, MINOR_IMPACT, and SEVERE_IMPACT;

FIG. 29 depicts the event processing steps from the instrumentation level up to the IT Aggregate level. ISE events are updated and regulated 235 and lead to the creation of bsi events, which in turn lead to the creation of cascaded bsd events. When bsi and bsd events are all closed for an IT Component in a given discipline, respectively a bsf, a bsa event is automatically reopened for that resource. Each time a change occurs at the component level 240, a new bsc event replaces the previous one for the related resource as a means to consolidate status information. In addition, bsi and bsd events are abstracted into new bsd events and propagated to the IT Aggregate level with seamless synchronization over the time. From that level 245, bsd events are further abstracted and propagated upwards;

The event processing steps from the IT Aggregate level up to the site business transaction level are depicted in FIG. 30. Abstracted bds events come from the IT Aggregate level are abstracted bsd events. From the IT Path level 250, those bsd events are abstracted into new bsd events to the SAT level where they are correlated 255 with bst events coming from the STEAD monitoring channel. From the SAT level, bsd and bst events are further abstracted into new bsd events to the BST level. Each time a change occurs at the BST level 260, a new bsc event replaces the previous one for the related resource as a means to consolidate status information; in addition, bsd events are abstracted to the upper level;

FIG. 31 depicts the event processing steps from the site business transaction level up to the Business Service level. From the BST level, bsd events are abstracted into new bsd events to (a) the business user group level and (b) the Business Service level. Each time a change occurs at the business user group level 265, a new uis event replaces the previous one for the related resource as a means to consolidate user business impact. Similarly, each time a change occurs at the Business Service level 270, a new sis event replaces the previous one for the related resource as a means to consolidate service business impact.

This system and method and many of its intended advantages will be understood from the disclosure herein and it will be apparent that, although the invention and its advantages have been described in detail, various changes, substitutions, and alterations may be made in the form, construction, and/or arrangement of the elements without departing from the spirit and scope of the invention, or sacrificing its material advantages, the form described previously and subsequently herein as being merely a preferred or exemplary embodiment thereof.

What is claimed is:

1. In an information technology infrastructure where users rely on business services to submit business transaction involving an orderly sequence of application transactions along a plurality of paths of the structure forming aggregates, a method for managing impact of events of the infrastructure on the business services, the method comprising:

configuring a management backbone comprising an abstraction layer for intermediate processing, wherein configuring the abstraction layer comprises;
    installing at least one peer-to-peer domain processor in the infrastructure,
    configuring the at least one peer-to-peer domain processor with a prepackaged set of event structures, data structures, and rules such that the at least one peer-to-peer domain processor can deliver at least one abstraction service,
    installing at least one peer-to-peer object directory services processor in the infrastructure, and
    configuring the at least one peer-to-peer object directory services processor with a pre-packaged set of event structures, data structures, and rules such that the at least one peer-to-peer object directory services processor can deliver at least one object directory service, and wherein configuring the management backbone further comprises:
    installing at least one peer-to-peer service processor in the infrastructure, and
    configuring the at least one peer-to-peer service processor with a pre-packaged set of event structures, data structures, and rules such that the service processor can deliver business impact statements;

monitoring the paths used by the application transactions to form monitoring information;

monitoring the aggregates to supplement the monitoring information;

automatically abstracting the monitoring information into business impact information;

using the business impact information to manage the impact of events on the business services;

decomposing at least one of the business services into at least one of the business transactions, wherein each of the business transactions branches to at least one site specific instance defined as a site business transaction;

decomposing each of a site business transactions into at least one site application transaction;

organizing each of the site application transactions into an orderly sequence;

defining one of the paths for each of the site application transactions;

associating to each of the site application transactions at least one first parameter to remotely submit a sample site application transaction at an associated source location of the infrastructure;

associating to each of a site application transactions at least one second parameter to request the management backbone to capture related execution information for each of the sample site application transactions executed at the associated source location of the infrastructure; and defining at least one business user group as a resource dependent on at least one of the site business transactions of the at least one business service.

2. The method of claim 1, wherein the act of monitoring the paths further comprises remotely submitting sample application transactions at selected source locations while requesting the management backbone to capture execution information along the paths of each application transaction.

3. The method of claim 1, wherein the act of monitoring the aggregates further comprises collating and optionally controlling underlying monitoring threads in conjunction with distributed management policies.

4. The method of claim 3, wherein at least one of the monitoring threads is an indicator.

5. The method of claim 1, wherein the act of using the business impact information to manage the impact of events on the business services further comprises:

translating an availability or a performance impact ascertained for the business transaction on given location in a business impact statement for a plurality of dependent business user groups; and translating the availability or the performance impact ascertained for all the business transactions on all the possible locations in a business impact statement for the business service.

6. The method of claim 1, wherein the act of using the business impact information to manage the impact of events on the business services further comprises recording impact events for providing off-line reporting capabilities.

7. The method of claim 1, wherein the act of using the business impact information to manage the impact of events on the business services further comprises running simulation sessions in parallel of a real-time session.

8. The method of claim 1, wherein the management backbone comprises an access layer for low-end monitoring, and wherein the method further comprises the step of configuring the access layer.

9. The method of claim 8, wherein the management backbone comprises a plurality of production servers, and wherein configuring the access layer comprises:

installing a peer-to-peer server processor on each production server;

configuring the peer-to-peer server processor with a pre-packaged set of event structures, data structures, control structures, actions, and rules such that the peer-to-peer server processor is capable of capturing external events, using embedded instrumentation functions, applying mapping methods, and enforcing distributed management polices;

auto-discovering or declaring components of the infrastructure owned by the peer-to-peer server processor; and referencing other components in dependency relationships, wherein the dependency relationships define at least one first component as a master resource and define at least one second component as a dependent resource.

10. The method of claim 1, further comprising defining a domain of the infrastructure as a logical realm.

11. The method of claim 10, wherein the act of defining the domain comprises:

linking the domain to at least one of the peer-to-peer domain processors configured to deliver abstraction services; and linking each of the domain processors of the domain to one of the peer-to-peer object directory services processors.

12. The method of claim 11, further comprising:

associating at least one of the aggregates to one of the domains such that at least one of the peer-to-peer domain processors will own the aggregate; and decomposing the aggregate into at least one aggregation pattern used by the peer-to-peer domain processor to query the peer-to-peer object directory services processor and identify matching components of the infrastructure.

13. The method of claim 1, further comprising branching each path onto at least one of the aggregates creating an auditable snapshot of the path.

14. The method of claim 1, further comprising defining an indicator of the infrastructure as an accretion point for a range of events carrying information related to a same operational parameter in a given management discipline.

15. The method of claim 14, further comprising:

associating the indicator to an independent event source or a controlled event source;

setting appropriate event capture arguments for the indicator when associated to the independent event source;

setting appropriate instrumentation arguments for the indicator when associated to the controlled event source;

auto-associating at least one peer-to-peer server processor to the indicator; and registering the indicator onto the at least one peer-to-peer server processor.

* * * * *